(12) United States Patent
Takagi et al.

(10) Patent No.: US 12,222,524 B2
(45) Date of Patent: Feb. 11, 2025

(54) OCULAR OPTICAL SYSTEM AND HEAD MOUNTED DISPLAY

(71) Applicant: Nikon Corporation, Tokyo (JP)

(72) Inventors: Hidetsugu Takagi, Yokohama (JP); Miho Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 1070 days.

(21) Appl. No.: 17/259,186

(22) PCT Filed: Jun. 19, 2019

(86) PCT No.: PCT/JP2019/024219
§ 371 (c)(1),
(2) Date: Jan. 10, 2021

(87) PCT Pub. No.: WO2020/021916
PCT Pub. Date: Jan. 30, 2020

(65) Prior Publication Data
US 2021/0157035 A1 May 27, 2021

(30) Foreign Application Priority Data
Jul. 24, 2018 (JP) .................................. 2018-138654

(51) Int. Cl.
*G02B 3/08* (2006.01)
(52) U.S. Cl.
CPC ....................................... *G02B 3/08* (2013.01)
(58) Field of Classification Search
CPC ............................ G02B 3/08; G02B 2027/011; G02B 27/0172; G02B 25/00; G02B 27/02
See application file for complete search history.

(56) References Cited

U.S. PATENT DOCUMENTS 10,140,832 B2 * 11/2018 Stout ................. G08B 13/19613
2008/0179520 A1 * 7/2008 Kauffman ............. H04N 25/671
348/E5.081
(Continued)

FOREIGN PATENT DOCUMENTS

DE 102014207492 B4 * 2/2017 ......... G02B 27/0172
JP H4-063401 U 5/1992
(Continued)

OTHER PUBLICATIONS

Translation of DE102014207492 (Year: 2017).*
(Continued)

*Primary Examiner* — Alicia M Harrington
(74) *Attorney, Agent, or Firm* — Potomac Law Group, PLLC

(57) ABSTRACT

An ocular optical system including a Fresnel lens having a plurality of Fresnel zones formed on a lens surface on an observation object side, the plurality of Fresnel zones being arranged concentrically side by side along an aspherical surface having a shape which is rotationally symmetric with respect to a central axis of the Fresnel lens, the ocular optical system satisfying the conditional expression $0<PAE1/PAC1\leq0.50$, where PAE1 represents an average pitch in a radial direction of Fresnel zones formed in a portion having a radius of 15 mm or more from the central axis of the Fresnel lens, and PAC1 represents an average pitch in the radial direction of Fresnel zones formed in a portion having a radius of 15 mm or less from the central axis of the Fresnel lens excluding a first Fresnel zone.

12 Claims, 33 Drawing Sheets

(56) References Cited

U.S. PATENT DOCUMENTS

| | | | |
|---|---|---|---|
| 2015/0301317 A1* | 10/2015 | Watanabe | G02B 27/4211 |
| | | | 359/356 |
| 2016/0178912 A1 | 6/2016 | Kusuda et al. | |
| 2018/0074318 A1 | 3/2018 | Wheelwright et al. | |
| 2018/0074325 A1 | 3/2018 | Wheelwright et al. | |
| 2020/0319344 A1* | 10/2020 | Ronchini Ximenes | ... G06T 7/50 |

FOREIGN PATENT DOCUMENTS

| | | |
|---|---|---|
| JP | 2015-049305 A | 3/2015 |
| JP | 2016-176981 A | 10/2016 |

OTHER PUBLICATIONS

Office Action issued Feb. 14, 2022, in Chinese Patent Application No. 201980046354.0.
Office Action issued Aug. 31, 2021, in Japanese Patent Application No. 2020-532218.
Office Action issued Dec. 28, 2022, in Taiwanese Patent Application No. 108122366.
International Preliminary Report on Patentability from International Patent Application No. PCT/JP2019/024219, Feb. 4, 2021.
International Search Report from International Patent Application No. PCT/JP2019/024219, Sep. 24, 2019.

* cited by examiner

OCULAR OPTICAL SYSTEM AND HEAD MOUNTED DISPLAY

TECHNICAL FIELD

The present invention relates to an ocular optical system and a head mounted display.

TECHNICAL BACKGROUND

For example, Patent literature 1 discloses a head mounted display comprising an ocular optical system. In such an ocular optical system, a Fresnel lens is being used in order to reduce thickness and weight, achieve wide angle and successfully correct aberrations. However, flares are likely to occur with conventional Fresnel lenses.

PRIOR ARTS LIST

Patent Document

Patent literature 1: Japanese Laid-Open Patent Publication No. 2015-49305(A)

SUMMARY OF THE INVENTION

An ocular optical system according to a first aspect comprises a Fresnel lens including a plurality of Fresnel zones formed on a lens surface on an observation object side, wherein the plurality of Fresnel zones are arranged concentrically side by side along an aspherical surface having a shape which is rotationally symmetric with respect to a central axis of the Fresnel lens, and satisfy the following conditional expression:

$$0 < PAE1/PAC1 \leq 0.50,$$

where PAE1 represents an average pitch in a radial direction of Fresnel zones formed in a portion having a radius of 15 mm or more from the central axis of the Fresnel lens out of the plurality of Fresnel zones, and PAC1 represents an average pitch in the radial direction of Fresnel zones formed in a portion having a radius of 15 mm or less from the central axis of the Fresnel lens excluding a first Fresnel zone located on a most central axis side of the Fresnel lens out of the plurality of Fresnel zones.

A head mounted display according to a second aspect comprises an image display part capable of displaying an image, and an ocular optical system for observing an image displayed on the image display part, wherein the ocular optical system is the ocular optical system according to the first aspect.

DESCRIPTION OF THE EMBODIMENT

Figure 1:
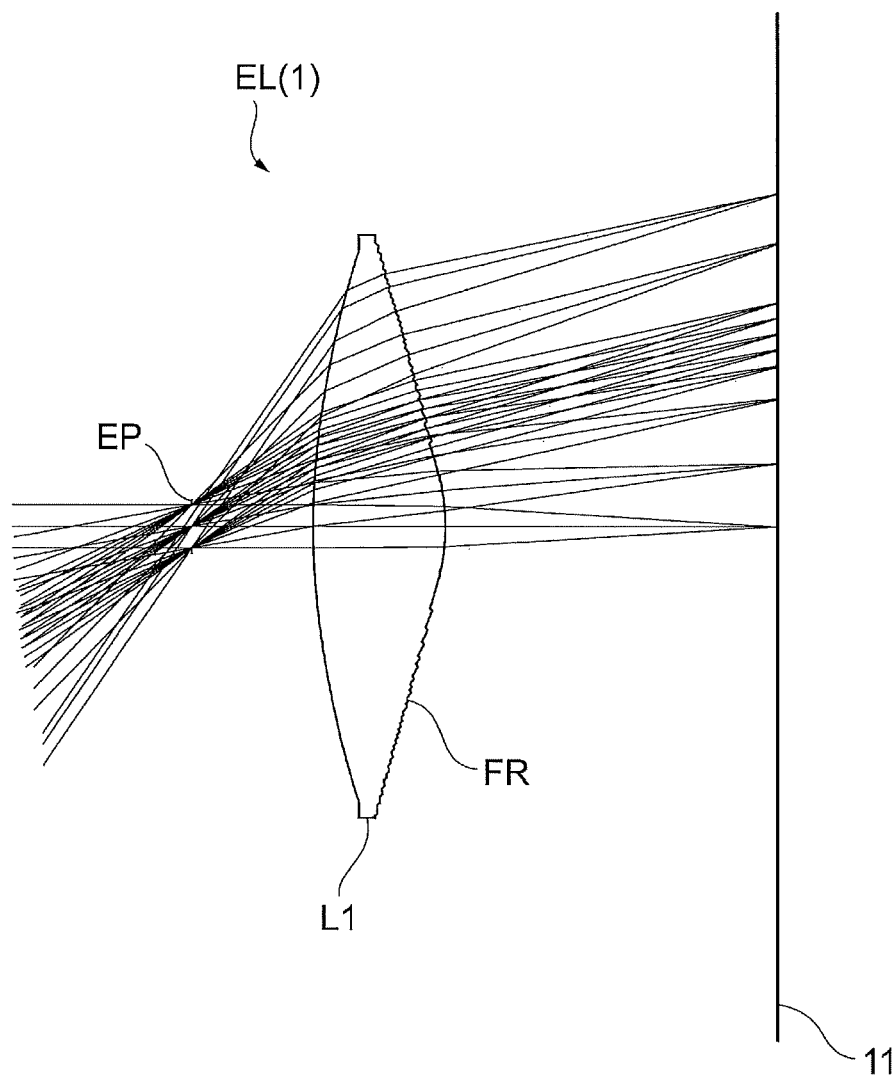
FIG. 1 is a lens configuration diagram of an ocular optical system according to a first example.

Hereinafter, an ocular optical system and a head mounted display according to the present embodiment will be described with reference to the drawings. As shown in FIG. 1, an ocular optical system EL (1) as an example of an ocular optical system EL according to the present embodiment is configured to comprise a Fresnel lens L1 having a plurality of Fresnel zones FR formed on the lens surface on an observation object side. The ocular optical system EL according to the present embodiment may be an ocular optical system EL (2) shown in FIG. 7, an ocular optical system EL (3) shown in FIG. 13, an ocular optical system EL (4) shown in FIG. 19, or an ocular optical system EL (5) shown in FIG. 25.

Figure 31:
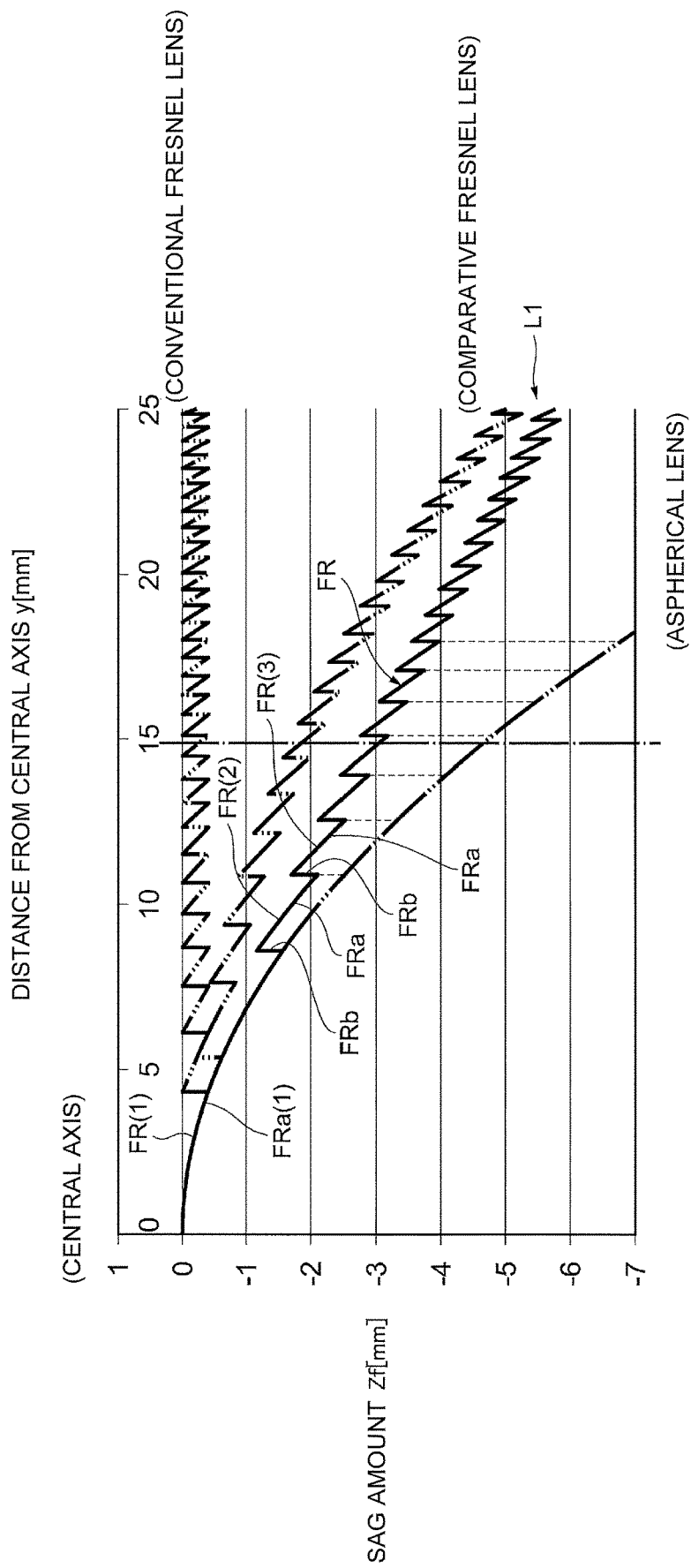
FIG. 31 is a comparative diagram of the Fresnel lens of the present embodiment and a conventional Fresnel lens.

For example, as shown in FIG. 31, a first Fresnel zone FR (1) located on the most central axis side of the Fresnel lens L1 out of a plurality of Fresnel zones FR is formed in a disk shape which is coaxial with the central axis of the Fresnel lens L1. The first Fresnel zone FR (1) has a Fresnel surface portion FRa (1) having an aspherical shape. A second and subsequent Fresnel zones FR which are counted from the central axis side of the Fresnel lens L1 out of the plurality of Fresnel zones FR are formed in annular shapes which are coaxial with the central axis of the Fresnel lens L1. The second and subsequent Fresnel zones FR each include a Fresnel surface portion FRa having an aspherical shape, and a stepped and wall-shaped wall surface portion FRb. Note that the first Fresnel zone FR (1) is formed in a shape (disk-like shape) that is not a ring-shaped (annular shape), but it is assumed in the present embodiment that the first Fresnel zone FR (1) is also included in a plurality of Fresnel zones FR. In FIG. 31 and FIGS. 2, 8, 14, 20, and 26 which will be described later, the signs of the Fresnel surface portions FRa and the wall surface portions FRb of the second and third Fresnel zones counted from the central axis side of the Fresnel lens L1 (the second Fresnel zone FR(2) and the third Fresnel zone FR(3)) out of the plurality of Fresnel zones FR are shown in these figures, but the signs of the Fresnel surface portions FRa and the wall surface portions FRb of the fourth and subsequent Fresnel zones are omitted from illustration.

The plurality of Fresnel zones FR are arranged concentrically side by side along an aspherical surface having a shape which is rotationally symmetric with respect to a central axis of the Fresnel lens L1 (hereinafter, may be referred to as an arrangement reference aspherical surface for convenience). For example, the vertex portions of the respective Fresnel zones FR are arranged side by side along an aspherical surface that is rotationally symmetric with respect to the central axis of the Fresnel lens L1. Further, for example, valley portions formed at the boundaries of adjacent Fresnel zones FR may be arranged side by side along an aspherical surface which is rotationally symmetric with respect to the central axis of the Fresnel lens L1.

The shape of the Fresnel surface portion FRa of each Fresnel zone FR is the shape of a divided surface obtained by dividing an aspherical surface (hereinafter referred to as a shape reference aspherical surface for convenience) constituting an aspherical lens (see, for example, a two-dotted chain line in FIG. 31) achieving desired optical performance in a ring-belt shape. This makes it possible to obtain a Fresnel lens L1 that is thinner than a normal aspherical lens. In the present embodiment, the plurality of Fresnel zones FR are not arranged along a plane perpendicular to a central axis as in a conventional Fresnel lens (see, for example, the two-dotted chain line in FIG. 31), but are arranged along an aspherical surface (arrangement reference aspherical surface) having an intermediate curvature which is larger than the curvature of the plane and smaller than the curvature of the shape reference aspherical surface (Fresnel surface portion FRa). As a result, the pitch (the distance between the vertex portions) in the radial direction of a plurality of Fresnel zones FR can be set to be larger in a neighborhood portion of the central axis of the Fresnel lens L1 while suppressing increase in thickness of the Fresnel lens L1 as compared with the conventional Fresnel lens. In other words, the number of discontinuous portions (wall surface portions FRb) of the Fresnel zones FR in the neighborhood portion of the central axis of the Fresnel lens L1 can be reduced as compared with the conventional Fresnel lens. Therefore, it is possible to reduce flare occurring in the central part of the visual field (that is, in the neighborhood portion of the central axis of the Fresnel lens L1), which is often visually recognized when the head mounted display is used.

In the ocular optical system EL according to the present embodiment, it is preferable that the following conditional expression (1) is satisfied.

$$0 < PAE1/PAC1 \leq 0.50 \quad (1),$$

where PAE1 represents an average pitch in a radial direction of Fresnel zones FR formed in a portion having a radius of 15 mm or more from the central axis of the Fresnel lens L1 out of the plurality of Fresnel zones FR, and PAC1 represents an average pitch in the radial direction of Fresnel zones FR formed in a portion having a radius of 15 mm or less from the central axis of the Fresnel lens L1 excluding a first Fresnel zone FR (1) located on a most central axis side of the Fresnel lens L1 out of the plurality of Fresnel zones FR.

The conditional expression (1) is a conditional expression for defining the ratio of the average pitch in the radial direction of Fresnel zones FR formed side by side in the portion having the radius of 15 mm or more from the central axis of the Fresnel lens L1 to the average pitch in the radial direction of the Fresnel zones FR formed side by side in the portion having the radius of 15 mm or less from the central axis of the Fresnel lens L1. When the conditional expression (1) is satisfied, the average pitch in the radial direction of the Fresnel zones FR increases and the number of discontinuous portions (wall surface portions FRb) of the Fresnel zones FR decreases in the portion having the radius of 15 mm or less from the central axis of the Fresnel lens L1, so that flare occurring in the neighborhood portion of the central axis of the Fresnel lens L1 can be reduced.

When the corresponding value of the conditional expression (1) exceeds the upper limit value, the average pitch in the radial direction of the Fresnel zones FR decreases and the number of the discontinuous portions (wall surface portions FRb) of the Fresnel zones FR increases in the portion having the radius of 15 mm or less from the central axis of the Fresnel lens L1, so that it becomes difficult to reduce the flare occurring in the neighborhood portion of the central axis of the Fresnel lens L1. In order to ensure the effect of the present embodiment, the upper limit value of the conditional expression (1) may be preferably set to 0.45. In order to avoid difficulty in manufacturing the Fresnel lens L1, a lower limit value of the conditional expression (1) may be preferably set to 0.30 or more.

In the ocular optical system EL according to the present embodiment, the following conditional expression (2) may be satisfied.

$$0 < PAE2/PAC1 \leq 0.55 \quad (2),$$

where PAE2 represents an average pitch in the radial direction of Fresnel zones FR formed in a portion having a radius of 15 mm to 22.5 mm from the central axis of the Fresnel lens L1 out of the plurality of Fresnel zones FR.

The conditional expression (2) is a conditional expression for defining the ratio of the average pitch in the radial direction of Fresnel zones FR formed side by side in the portion having the radius of 15 mm to 22.5 mm from the central axis of the Fresnel lens L1 to the average pitch in the radial direction of the Fresnel zones FR formed side by side in the portion having the radius of 15 mm or less from the central axis of the Fresnel lens L1. When the conditional expression (2) is satisfied, the average pitch in the radial direction of the Fresnel zones FR increases and the number of the discontinuous portions (wall surface portions FRb) of the Fresnel zones FR in the portion having the radius of 15 mm or less from the central axis of the Fresnel lens L1, so that flare occurring in the neighborhood portion of the central axis of the Fresnel lens L1 can be reduced.

When the corresponding value of the conditional expression (2) exceeds the upper limit value, the average pitch in the radial direction of the Fresnel zones FR decreases and the number of the discontinuous portions (wall surface portions FRb) of the Fresnel zones FR increases in the portion having the radius of 15 mm or less from the central axis of the Fresnel lens L1, so that it becomes difficult to reduce the flare occurring in the neighborhood portion of the central axis of the Fresnel lens L1. In order to ensure the effect of the present embodiment, the upper limit value of the conditional expression (2) may be preferably set to 0.51. In order to avoid difficulty in manufacturing the Fresnel lens L1, a lower limit value of the conditional expression (2) may be preferably set to 0.30 or more.

In the ocular optical system EL according to the present embodiment, the following conditional expression (3) may be satisfied.

$$0 < PAE3/PAC1 \leq 0.60 \quad (3),$$

where PAE3 represents an average pitch in the radial direction of Fresnel zones FR formed in a portion having a radius of 15 mm to 20 mm from the central axis of the Fresnel lens L1 out of the plurality of Fresnel zones FR.

The conditional expression (3) is a conditional expression for defining the ratio of the average pitch in the radial direction of the Fresnel zones FR formed side by side in the portion having the radius of 15 mm to 20 mm from the central axis of the Fresnel lens L1 to the average pitch in the radial direction of the Fresnel zones FR formed side by side in the portion having the radius of 15 mm or less from the central axis of the Fresnel lens L1. When the conditional expression (3) is satisfied, the average pitch in the radial direction of the Fresnel zones FR increases and the number of discontinuous portions (wall surface portions FRb) of the Fresnel zones FR decreases in the portion having the radius of 15 mm or less from the central axis of the Fresnel lens L1, so that the flare occurring in the neighborhood portion of the central axis of the Fresnel lens L1 can be reduced.

When the corresponding value of the conditional expression (3) exceeds the upper limit value, the average pitch in the radial direction of the Fresnel zones FR decreases and the discontinuous portions (wall surface portions FRb) of the Fresnel zones FR increases in the portion having the radius of 15 mm or less from the central axis of the Fresnel lens L1, so that it becomes difficult to reduce the flare occurring in the neighborhood portion of the central axis of the Fresnel lens L1. In order to ensure the effect of the present embodiment, the upper limit value of the conditional expression (3) may be preferably set to 0.55. In order to avoid difficulty in manufacturing the Fresnel lens L1, a lower limit value of the conditional expression (3) may be preferably set to 0.30 or more.

In the ocular optical system EL according to the present embodiment, the following conditional expression (4) may be satisfied.

$$PAC1 \geq 1.0 \text{ [mm]} \quad (4)$$

The conditional expression (4) is a conditional expression for defining the average pitch in the radial direction of the Fresnel zones FR formed side by side in the portion having the radius of 15 mm or less from the central axis of the Fresnel lens L1. When the conditional expression (4) is satisfied, the average pitch in the radial direction of the Fresnel zones FR increases and the number of discontinuous portions (wall surface portions FRb) of the Fresnel zones FR decreases in the portion having the radius of 15 mm or less from the central axis of the Fresnel lens L1, so that flare occurring in the neighborhood portion of the central axis of the Fresnel lens L1 can be reduced.

When the corresponding value of the conditional expression (4) is less than the lower limit value, the average pitch in the radial direction of the Fresnel zones FR decreases and the number of the discontinuous portions (wall surface portions FRb) of the Fresnel zones FR increases in the portion having the radius of 15 mm or less from the central axis of the Fresnel lens L1, so that it becomes difficult to reduce the flare occurring in the neighborhood portion of the central axis of the Fresnel lens L1. In order to ensure the effect of the present embodiment, the lower limit value of the conditional expression (4) may be preferably set to 1.5 [mm]. In order to prevent the Fresnel lens L1 from increasing in size, an upper limit value of the conditional expression (4) may be preferably set to 3.5 [mm] or less.

In the ocular optical system EL according to the present embodiment, the following conditional expression (5) may be satisfied.

$$PMX1/PMN1 \geq 10.0 \quad (5),$$

where PMX1 represents a maximum pitch in the radial direction of the plurality of Fresnel zones FR, and PMN1 represents a minimum pitch in the radial direction of the plurality of Fresnel zones FR.

The conditional expression (5) is a conditional expression for defining the ratio of the maximum pitch in the radial direction of the plurality of Fresnel zones FR to the minimum pitch in the radial direction of the plurality of Fresnel zone FR. The pitch in the radial direction of the Fresnel zones FR becomes relatively larger as they are closer to the central axis side of the Fresnel lens L1. When the conditional expression (5) is satisfied, the pitch in the radial direction of the Fresnel zones FR increases and the number of discontinuous portions (wall surface portions FRb) of the Fresnel zones FR decreases in the neighborhood portion of the central axis of the Fresnel lens L1, so that flare occurring in the neighborhood portion of the central axis of the Fresnel lens L1 can be reduced.

When the corresponding value of the conditional expression (5) is less than the lower limit value, the pitch in the radial direction of the Fresnel zones FR decreases and the number of discontinuous portions (wall surface portions FRb) of the Fresnel zones FR increases in the neighborhood portion of the central axis of the Fresnel lens L1, so that it becomes difficult to reduce flare occurring in the neighborhood portion of the central axis of the Fresnel lens L1. In order to ensure the effect of the present embodiment, the lower limit value of the conditional expression (5) may be preferably set to 15.0. In order to avoid difficulty in manufacturing the Fresnel lens L1, an upper limit value of the conditional expression (5) may be preferably set to 35.5 or less.

In the ocular optical system EL according to the present embodiment, the following conditional expression (6) may be satisfied.

$$1 < PMX2/PMN2 \leq 7.5 \qquad (6),$$

where PMX2 represents a maximum pitch in the radial direction of Fresnel zones FR formed in a portion having a radius of 15 mm or less from the central axis of the Fresnel lens L1 out of the plurality of Fresnel zones FR, and PMN2 represents a minimum pitch in the radial direction of the Fresnel zones FR formed in the portion having the radius of 15 mm or less from the central axis of the Fresnel lens L1 out of the plurality of Fresnel zones FR.

The conditional expression (6) is a conditional expression for defining the ratio of the maximum pitch in the radial direction of Fresnel zones FR formed side by side in a portion having a radius of 15 mm or less from the central axis of the Fresnel lens L1 to the minimum pitch in the radial direction of Fresnel zones FR formed side by side in the portion having the radius of 15 mm or less from the central axis of the Fresnel lens L1. When the conditional expression (6) is satisfied, the change of the pitch in the radial direction of the Fresnel zones FR moderates and the number of discontinuous portions (wall surface portions FRb) of the Fresnel zones FR decreases in the portion having the radius of 15 mm or less from the central axis of the Fresnel lens L1, so that flare occurring in the neighborhood portion of the central axis of the Fresnel lens L1 can be reduced.

When the corresponding value of the conditional expression (6) exceeds the upper limit value, the change in the pitch in the radial direction of the Fresnel zones FR becomes sharp and the number of the discontinuous portions (wall surface portions FRb) increases in the portion having the radius of 15 mm or less from the central axis of the Fresnel lens L1, so that it becomes difficult to reduce the flare occurring in the neighborhood portion of the central axis of the Fresnel lens L1. In order to ensure the effect of the present embodiment, the upper limit value of the conditional expression (6) may be preferably set to 6.5.

In the ocular optical system EL according to the present embodiment, the following conditional expression (7) may be satisfied.

$$1 < PMX3/PMN3 \leq 2.5 \qquad (7),$$

where PMX3 represents a maximum pitch in the radial direction of Fresnel zones FR formed in a portion having a radius of 15 mm or less from the central axis of the Fresnel lens L1 excluding a first Fresnel zone FR (1) out of the plurality of Fresnel zones FR, and PMN3 represents a minimum pitch in the radial direction of the Fresnel zones FR formed in the portion having the radius of 15 mm or less from the central axis of the Fresnel lens L1 excluding the first Fresnel zone FR (1) out of the plurality of Fresnel zones FR.

The conditional expression (7) is a conditional expression for defining the ratio of the maximum pitch in the radial direction of Fresnel zones FR formed side by side in a portion having a radius of 15 mm or less from the central axis of the Fresnel lens L1 to the minimum pitch in the radial direction of Fresnel zones FR formed side by side in the portion having the radius of 15 mm or less from the central axis of the Fresnel lens L1 in the case of exclusion of the first Fresnel zone FR (1). When the conditional expression (7) is satisfied, the change of the pitch in the radial direction of the Fresnel zones FR moderates and the number of discontinuous portions (wall surface portions FRb) of the Fresnel zones FR decreases in the portion having the radius of 15 mm or less from the central axis of the Fresnel lens L1, so that flare occurring in the neighborhood portion of the central axis of the Fresnel lens L1 can be reduced.

When the corresponding value of the conditional expression (7) exceeds the upper limit value, the change in the pitch in the radial direction of the Fresnel zones FR becomes sharp and the number of discontinuous portions (wall surface portions FRb) of the Fresnel zones FR increases in the portion having the radius of 15 mm or less from the central axis of the Fresnel lens L1, so that it becomes difficult to reduce flare occurring in the neighborhood portion of the central axis of the Fresnel lens L1. In order to ensure the effect of the present embodiment, the upper limit value of the conditional expression (7) may be preferably set to 2.0.

In the ocular optical system EL according to the present embodiment, the following conditional expression (8) may be satisfied.

$$QE1/QC1 \geq 2.0 \qquad (8),$$

where QE1 represents the number of Fresnel zones FR formed in a portion having a radius of 15 mm to 22.5 mm from the central axis of the Fresnel lens L1 out of the plurality of Fresnel zones FR, and QC1 represents the number of Fresnel zones FR formed in a portion having a radius of 15 mm or less from the central axis of the Fresnel lens L1 excluding a first Fresnel zone FR (1) out of the plurality of Fresnel zones FR.

The conditional expression (8) is a conditional expression for defining the number of the Fresnel zones FR formed side by side in the portion having the radius of 15 mm to 22.5 mm from the central axis of the Fresnel lens L1 to the number of the Fresnel zones FR formed side by side in the portion having the radius of 15 mm or less from the central axis of the Fresnel lens L1. When the conditional expression (8) is satisfied, the number of the Fresnel zones FR in the portion having the radius of 15 mm or less from the central axis of the Fresnel lens L1 decreases, so that flare occurring in the neighborhood portion of the central axis of the Fresnel lens L1 can be reduced.

When the corresponding value of the conditional expression (8) falls below the lower limit value, the number of the Fresnel zones FR in the portion having the radius of 15 mm or less from the central axis of the Fresnel lens L1 increases, so that it becomes difficult to reduce the flare occurring in the neighborhood portion of the central axis of the Fresnel lens L1. In order to ensure the effect of the present embodiment, the lower limit value of the conditional expression (8) may be preferably set to 2.5. In order to avoid difficulty in manufacturing the Fresnel lens L1, an upper limit value of the conditional expression (8) may be preferably set to 5.0 or less.

In the ocular optical system EL according to the present embodiment, the following conditional expression (9) may be satisfied.

$$QE2/QC1 \geq 1.0 \qquad (9),$$

where QE2 represents the number of Fresnel zones FR formed in a portion having a radius of 15 mm to 20 mm from the central axis of the Fresnel lens L1 out of the plurality of Fresnel zones FR, and QC1 represents the number of Fresnel zones FR formed in a portion having a radius of 15 mm or less from the central axis of the Fresnel lens L1 excluding a first Fresnel zone FR (1) out of the plurality of Fresnel zones FR.

The conditional expression (9) is a conditional expression for defining the number of the Fresnel zones FR formed side by side in the portion having the radius of 15 mm to 20 mm from the central axis of the Fresnel lens L1 to the number of the Fresnel zones FR formed side by side in the portion having the radius of 15 mm or less from the central axis of the Fresnel lens L1. When the conditional expression (9) is satisfied, the number of the Fresnel zones FR in the portion having the radius of 15 mm or less from the central axis of the Fresnel lens L1 decreases, so that flare occurring in the neighborhood portion of the central axis of the Fresnel lens L1 can be reduced.

When the corresponding value of the conditional expression (9) is less than the lower limit value, the number of the Fresnel zones FR in the portion having the radius of 15 mm or less from the central axis of the Fresnel lens L1 increases, so that it becomes difficult to reduce the flare occurring in the neighborhood portion of the central axis of the Fresnel lens L1. In order to ensure the effect of the present embodiment, the lower limit value of the conditional expression (9) may be preferably set to 1.5. In order to avoid difficulty in manufacturing the Fresnel lens L1, an upper limit value of the conditional expression (9) may be preferably set to 3.0 or less.

Figure 32A:
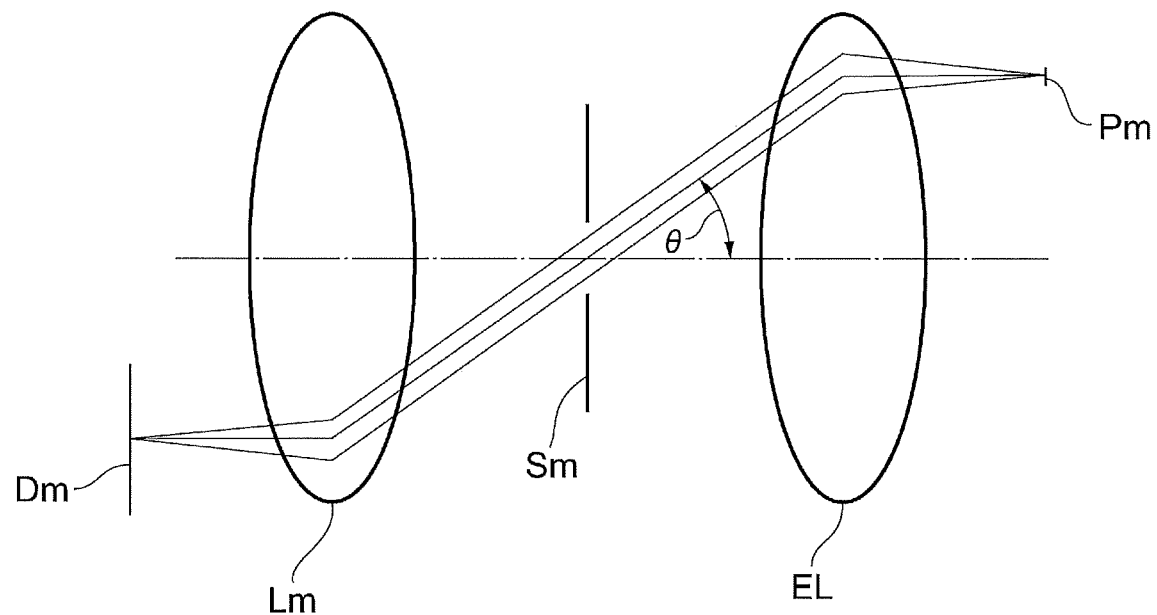
FIG. 32A is a schematic diagram of a measuring device for measuring flare.
Figure 32B:
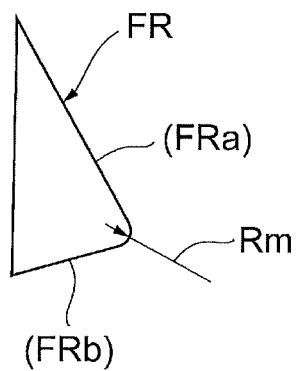
FIG. 32B is a cross-sectional view showing a part of a Fresnel zone.

In the ocular optical system EL according to the present embodiment, the wall surface portions FRb in the plurality of Fresnel zones FR extend in parallel to the central axis of the Fresnel lens L1, but they are not limited to this configuration. For example, as shown in FIG. 32B, the wall surface portions FRb of the Fresnel zones FR may be inclined in a direction opposite to a direction in which the Fresnel surface portions FRa are inclined (with respect to the central axis of the Fresnel lens L1). As a result, light incident on the Fresnel surface portions FRa in the Fresnel zones FR are less likely to reach the wall surface portions FRb, so that flare occurring in the neighborhood portion of the central axis of the Fresnel lens L1 can be reduced.

In the ocular optical system EL according to the present embodiment, the wall surface portions FRb of the plurality of Fresnel zones FR may be provided with light-shielding members (not shown). As a result, even if light incident on the Fresnel surface portions FRa in the Fresnel zones FR reach the wall surface portions FRb, the light is shielded by the light-shielding members, so that flare occurring in the neighborhood portion of the central axis of the Fresnel lens L1 can be reduced. Examples of the light-shielding member provided on the wall surface portion FRb of the Fresnel zone FR include a paint using a black synthetic resin such as a curable acrylic urethane paint and a phthalic acid resin enamel paint, which can be coated on the wall surface portion FRb.

In the ocular optical system EL according to the present embodiment, an aspherical surface (arrangement reference aspherical surface) on which the vertex portions of the respective Fresnel zones FR are arranged is expressed by using the following expression (A).

[Expression 1]

$$Z_d = \frac{y^2/R_d}{1+\sqrt{1-(1+k_d)y^2/R_d^2}} + \sum_{i=2}^{10} A_{2i} \times y^{2i}, \quad (A)$$

where $Z_d$ represents a sag amount (in the central axis direction of the Fresnel lens L1) of the arrangement reference aspherical surface at a distance y from the central axis of the Fresnel lens L1, $R_d$ represents a radius of curvature of a reference spherical surface in the arrangement reference aspherical surface (paraxial radius of curvature), $k_d$ represents a conic constant of the arrangement reference aspherical surface, and $A_{2i}$ represents a (2×i)-order aspherical coefficient.

Further, the shape reference aspherical surface that is the base of the Fresnel surface portion FRa in the Fresnel zone FR is expressed by using the following expression (B).

[Expression 2]

$$Z_r = \frac{y^2/R_r}{1+\sqrt{1-(1+k_r)y^2/R_r^2}} + \sum_{i=2}^{10} B_{2i} \times y^{2i}, \quad (B)$$

where $Z_r$ represents a sag amount (in the central axis direction of the Fresnel lens L1) of the shape reference aspherical surface at the distance y from the central axis of the Fresnel lens L1, $R_r$ represents the radius of curvature of a reference spherical surface in the shape reference aspherical surface (paraxial radius of curvature), $k_r$ represents a conic constant of the shape reference aspherical surface, and $B_{2i}$ represents a (2×i)-order aspherical coefficient.

Here, the relationship between the sag amount $Z_d$ of the arrangement reference aspherical surface and the sag amount $Z_r$ of the shape reference aspherical surface can be defined by using the following expression (C).

[Expression 3]

$$(Z_r-z_d)/Sg=q+m \quad (C)$$

where Sg represents the length in the central axis direction of the wall surface portion FRb in the Fresnel zone FR, q represents the quotient of division on the left side of the expression (C), and m represents the residual of division on the left side of the expression (C).

The Fresnel surface portion FRa in the Fresnel zone FR is expressed by using the following expression (D) based on the expressions (A) to (C). Note that in FIG. 31 and FIGS. 2, 8, 14, 20, and 26 described later, the sag amount $Z_f$ of the Fresnel surface portion FRa (the sag amount $Z_d$ of the arrangement reference aspherical surface and the sag amount $Z_r$ of the shape reference aspherical surface) is indicated by assigning a sign of minus (−) to a value advancing from a tangent plane (reference plane) passing through the vertex of the aspherical surface to an eyepoint side.

[Expression 4]

$$Z_f=Z_r-(q \times Sg) \quad (D),$$

where $Z_f$ represents a sag amount (in the central axis direction of the Fresnel lens L1) of the Fresnel surface portion FRa at the distance y from the central axis of the Fresnel lens L1.

In the ocular optical system EL according to the present embodiment, the following conditional expression (10) may be satisfied.

$$k_d \leq -5.0 \quad (10)$$

The conditional expression (10) is a conditional expression for defining the conic constant in the expression (A) of the aspherical surface (arrangement reference aspherical surface) on which a plurality of Fresnel zones FR are arranged. When the conditional expression (10) is satisfied, flare occurring in the neighborhood portion of the central axis of the Fresnel lens L1 can be reduced.

When the corresponding value of the conditional expression (10) exceeds the upper limit value, this is not preferable because the number of discontinuous portions (wall surface portions FRb) of Fresnel zones FR in a region near to the central axis of the Fresnel lens L1 increases. In order to ensure the effect of the present embodiment, the upper limit value of the conditional expression (10) may be preferably set to −10.0. In order to avoid difficulty in reducing flare, a lower limit value of the conditional expression (10) may be preferably set to −30.0 or more.

In the ocular optical system EL according to the present embodiment, the following conditional expression (11) may be satisfied.

$$k_d < k_r \quad (11)$$

The conditional expression (11) is a conditional expression for defining the relationship between the conic constant in the arrangement reference aspherical surface and the conic constant in the shape reference aspherical surface. When the conditional expression (11) is satisfied, flare occurring in the neighborhood portion of the central axis of the Fresnel lens L1 can be reduced.

Note that not only a case where the vertex portions of the respective Fresnel zones FR are arranged side by side along the arrangement reference aspherical surface, but also even a case where the valley portions of the respective Fresnel zones FR are arranged side by side along the arrangement reference aspherical surface, it is possible to represent the arrangement reference aspherical surface based on the expression (A). Not only a case where the wall surface portions FRb of the Fresnel zones FR extends in parallel to the central axis of the Fresnel lens L1, but also even a case where the wall surface portions FRb of the Fresnel zones FR are inclined with respect to the central axis of the Fresnel lens L1, it is also possible to represent the arrangement reference aspherical surface based on the expression (A). The lengths Sg in the central axial direction of the wall surface portions FRb in the Fresnel zones FR are set to a constant value, but may be set to different values among the Fresnel zones FR. Further, it is desirable that the outer diameter of the Fresnel lens L1 is 30 mm to 75 mm in diameter.

Figure 33:
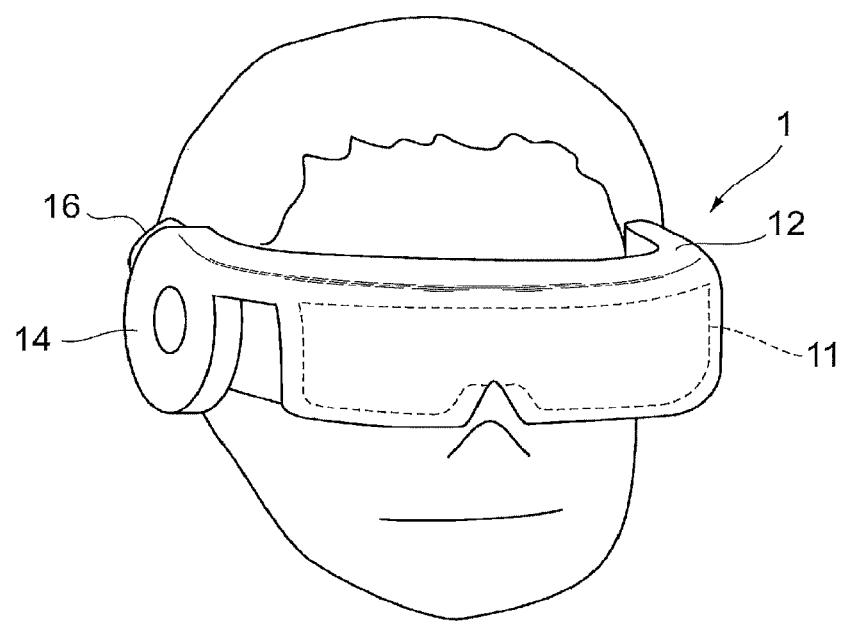
FIG. 33 is an external view of a head mounted display.

A head mounted display according to the present embodiment is configured to comprise the ocular optical system having the above-described configuration. As a specific example, a head mounted display comprising the above-described ocular optical system EL will be described with reference to FIG. 33. The head mounted display 1 shown in FIG. 33 is used while fixed to the head of a user. The head mounted display 1 is configured to comprise an image display part 11, an ocular optical system EL (not shown in FIG. 33), and a housing 12 for accommodating these components. Further, speakers 14 for providing voice information to the user are arranged on the right and left sides of the housing 12. Further, a band 16 for fixing the housing 12 to the user's head is attached to a rear portion of the housing 12.

The image display part 11 and the ocular optical system EL are configured to be arranged so as to face the user's eyes with the housing 12 being fixed to the user's head. Although detailed illustration is omitted, the image display part 11 is configured by using, for example, a liquid crystal display device or the like. Further, two sets of ocular optical systems EL are provided so as to correspond to both the user's eyes. In such a head mounted display 1, when the image display part 11 displays a predetermined image, light from the image display part 11 passes through the ocular optical systems EL and reaches the user's eyes. As a result, the user can see the image displayed on the image display part 11 via the ocular optical systems EL. According to the above configuration, by mounting the ocular optical systems EL, it is possible to obtain a head mounted display that has a wide viewing angle in spite of a thin type design and is successfully corrected for various aberrations such as astigmatism.

Note that the image to be displayed by the image display part 11 may be a still image or a video image. Further, the image display part 11 may be configured to display a parallax image for the right eye and a parallax image for the left eye respectively so that the parallax images are recognized as a stereoscopic image by the user who views the parallax images via the ocular optical systems EL. Further, the image display part 11 is not limited to the configuration provided integrally with the housing 12. For example, it may be configured so that a mobile terminal or the like which is provided separately from the housing and capable of displaying an image may be attached to the housing and used as an image display part.

EXAMPLES

Hereinafter, the ocular optical system EL according to examples of the present embodiment will be described with reference to the drawings. FIG. 1, FIG. 7, FIG. 13, FIG. 19, and FIG. 25 are diagrams showing lens configurations of ocular optical systems EL {EL (1) to EL (5)} according to first to fifth examples. FIG. 2, FIG. 8, FIG. 14, FIG. 20, and FIG. 26 are enlarged views showing the shapes of the Fresnel lenses L1 of the ocular optical systems EL {EL (1) to EL (5)} according to the first to fifth examples.

In FIG. 1, FIG. 2, FIG. 7, FIG. 8, FIG. 13, FIG. 14, FIG. 19, FIG. 20, FIG. 25 and FIG. 26, each lens is represented by a combination of a character L and a numeral (or alphabet). In this case, in order to prevent the types and numbers of characters and numerals from being multiplied and thus complicated, lens groups and the like are represented by independently using combinations of characters and numerals on an example basis. Therefore, even if a combination of the same character and the same numeral is used among the examples, it does not mean that the combination represents the same configuration.

Tables 1 to 5 will be presented below. Table 1 to Table 5 are tables indicating specification values of first to fifth examples, respectively. In each example, d-line (wavelength λ=587.6 nm), e-line (wavelength λ=546.1 nm), g-line (wavelength λ=435.8 nm), C-line (wavelength λ=656.3 nm), and F-line (wavelength λ=486.1 nm) are selected as targets for calculation of aberration characteristics.

In [Specification Data] of each table, f represents the focal length of the ocular optical system, w represents a viewing angle (unit is "°"), ER represents an eye relief, TL represents the entire length of the ocular optical system (the distance from an eyepoint to an image display part (observation object)), and DA represents the outer diameter of the Fresnel lens. PAC1, PAE1, PAE2, and PAE3 indicated in [Specification Data] are the same as those described in the above-described embodiment. PMX1, PMN1, PMX2, PMN2, PMX3, and PMN3 indicated in [Specification Data] are the same as those described in the above-described embodiment. QC1, QE1, and QE2 indicated in [Specification Data] are the same as those described in the above-described embodiment.

In [Lens Data], the surface number represents the number of each lens surface counted from the eyepoint side, R represents the radius of curvature of each lens surface, D represents the interval between respective lens surfaces, nd represents a refractive index with reference to d-line (wavelength λ=587.6 nm), and vd represents an Abbe number with reference to d-line (wavelength λ=587.6 nm). Note that *a attached on the right side of a first column (surface number) indicates that the lens surface is aspherical, and *b attached on the right side of the first column (surface number) indicates that the lens surface is a Fresnel surface (Fresnel surface portion of Fresnel zone FR) having an aspherical shape. The radius of curvature "∞" indicates a flat surface or an aperture, and the description of the refractive index nd=1.0000 of air is omitted.

In [Aspherical Surface Data], when the corresponding lens surface is a Fresnel surface having an aspherical shape, the aspherical coefficient of the above-mentioned expression (A) for the arrangement reference aspherical surface and the aspherical coefficient of the above-mentioned expression (B) for the shape reference aspherical surface are indicated. When the corresponding lens surface is a general aspherical surface, an aspherical coefficient expressed by the following expression (E) is indicated.

[Expression 5]

$$Z = \frac{y^2/R}{1 + \sqrt{1 - (1+k)y^2/R^2}} + \sum_{i=2}^{10} C_{2i} \times y^{2i}, \quad (E)$$

where Z represents the sag amount (in the central axis direction of the lens) of an aspherical surface at the distance y from the central axis of the lens, R represents the radius of curvature of a reference spherical surface on an aspherical surface (paraxial radius of curvature), k represents the conic constant of the aspherical surface, and $C_{2i}$ represents the (2×i)-order aspherical coefficient.

In [Aspherical Surface Data], "E-n" represents "×10$^{-n}$". For example, "1.234E-05" represents "1.234×10$^{-5}$". In [Fresnel Data], "zone" indicates the order of a Fresnel zone counted from the central axis of the Fresnel lens. "Valley coordinate y" indicates the distance from the central axis of the Fresnel lens at the valley portion formed at the boundary between the (N)-th Fresnel zone and the (N+1)-th Fresnel zone which correspond to the order (N)–(N+1) indicated in "zone". "Valley coordinate z" indicates the sag amount (in the central axis direction of the Fresnel lens) of the valley portion formed at the boundary between the (N)-th Fresnel zone and the (N+1)-th Fresnel zone. "Mountain coordinate y" indicates the distance from the central axis of the Fresnel lens at the vertex portion of the (N+1)-th Fresnel zone and "Mountain coordinate z" indicates the sag amount (in the central axis direction of the Fresnel lens) at the vertex portion of the (N+1)-th Fresnel zone. "Pitch" indicates the pitch in the radial direction (y-direction) between the (N)-th Fresnel zone and the (N+1)-th Fresnel zone. [Conditional Expression Corresponding Value] indicates the corresponding value of each conditional expression.

Note that "mm" is generally used as the units of the focal length f, the radius of curvature R, and other lengths listed in all the following specification values, but it is not specifically limited because the optical system may have same level optical performance even when it is proportionally expanded or proportionally contracted. The foregoing description on the tables are common to all the examples, and the duplicate description thereon is omitted.

First Example

The first example will be described with reference to FIGS. 1 to 6 and Table 1. The ocular optical system of each example is used as an ocular optical system for observing an image displayed on the image display part 11. FIG. 1 is a diagram showing a lens configuration of the ocular optical system according to the first example of the present embodiment. The ocular optical system EL (1) according to the first example comprises a biconvex Fresnel lens L1 having a positive refractive power.

Figure 2:
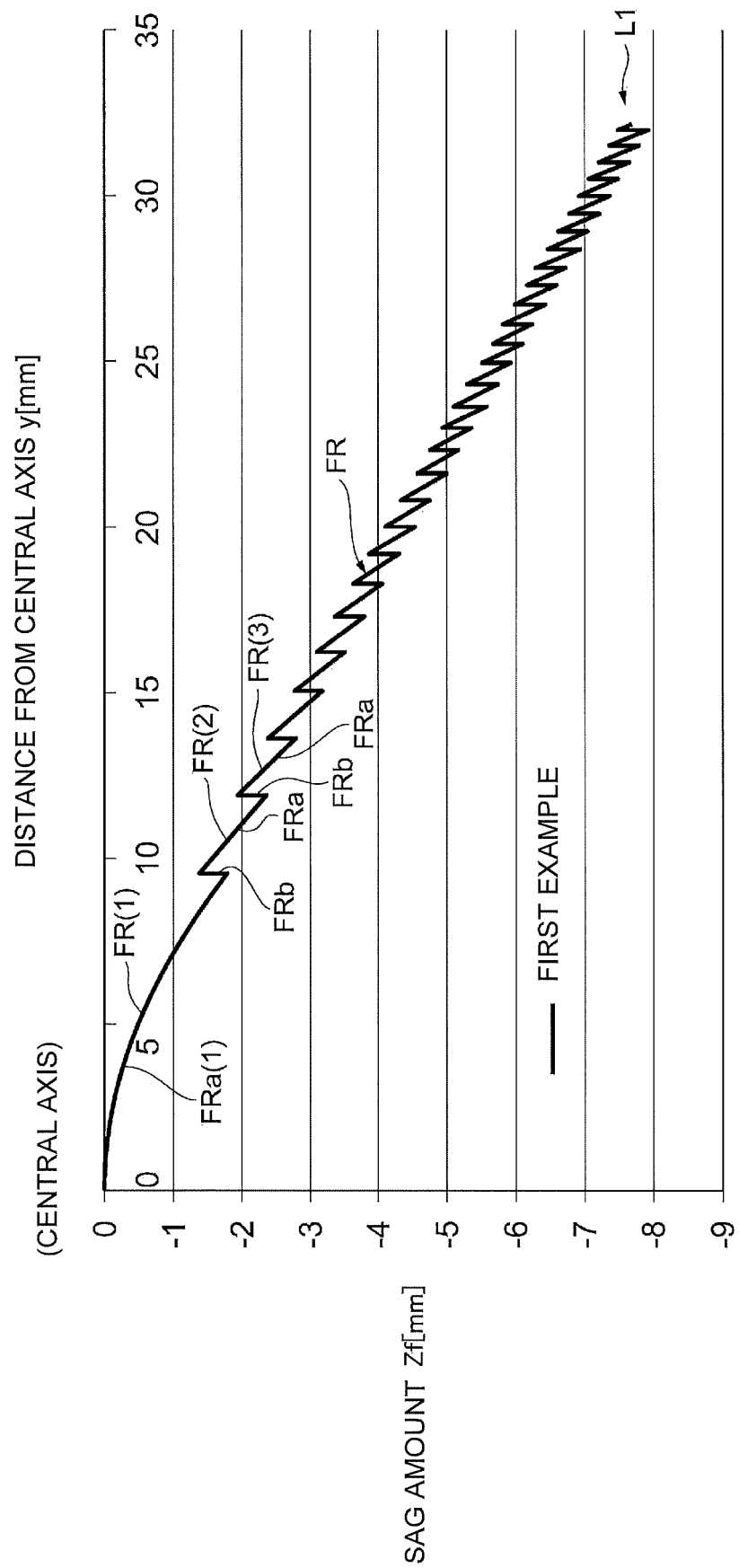
FIG. 2 is an enlarged view showing the shape of a Fresnel lens of the ocular optical system according to the first example.

An aspherical surface is formed on the lens surface on an eyepoint EP side of the Fresnel lens L1. A plurality of Fresnel zones FR are formed on the lens surface on an image display part 11 side (observation object side) of the Fresnel lens L1. As shown in FIG. 2, the first Fresnel zone FR (1) located on the most central axis side of the Fresnel lens L1 out of the plurality of Fresnel zones FR is formed in a disk-like shape coaxial with the central axis of the Fresnel lens L1. The first Fresnel zone FR (1) has an aspherical Fresnel surface portion FRa (1). The second and subsequent Fresnel zones FR counted from the central axis side of the Fresnel lens L1 out of the plurality of Fresnel zones FR are formed in an annular shape coaxial with the central axis of the Fresnel lens L1. The second and subsequent Fresnel zones FR each have an aspherical Fresnel surface portion FRa and a stepped and wall-shaped wall surface portion FRb. The vertex portions of the respective Fresnel zones FR are arranged side by side along the above-mentioned arrangement reference aspherical surface.

The following Table 1 lists specification values of the ocular optical system according to the first example.

TABLE 1

| [Specification Data] |
|---|
| f = 41.65 |
| ω = ±55° |
| ER = 14.30 |
| TL = 68.91 |
| DA = 66.00 |
| PAC1 = 2.02 |
| PAE1 = 0.69 |
| PAE2 = 0.96 |
| PAE3 = 1.11 |
| PMX1 = 9.60 |
| PMN1 = 0.45 |
| PMX2 = 9.60 |
| PMN2 = 1.70 |
| PMX3 = 2.34 |
| PMN3 = 1.70 |
| QC1 = 2 |
| QE1 = 9 |
| QE2 = 5 |

TABLE 1-continued

[Lens Data]

| Surface Number | R | D | vd | nd |
|---|---|---|---|---|
| 1*a | 86.8649804 | 15.40 | 57.07 | 1.4929 |
| 2*b | −25.30952683 | 39.21 | | |

[Aspherical Surface Data]

1st Surface k = −2.29
C4 = 0.00E+00, C6 = −2.62E−09, C8 = 4.41E−12,
C10 = −2.34E−15, C12 = 2.14E−19
C14 = 0.00E+00, C16 = 0.00E+00, C18 = 0.00E+00,
C20 = 0.00E+00
2nd Surface (arrangement reference aspherical surface)

kd = −12.45
A4 = 0.00E+00, A6 = 0.00E+00, A8 = 0.00E+00,
A10 = 0.00E+00, A12 = 0.00E+00
A14 = 0.00E+00, A16 = 0.00E+00, A18 = 0.00E+00,
A20 = 0.00E+00
2nd Surface (shape reference aspherical surface)

kr = −1.48
B4 = 0.00E+00, B6 = −8.98E−09, B8 = 1.22E−11,
B10 = −4.89E−15, B12 = 0.00E+00
B14 = 0.00E+00, B16 = 0.00E+00, B18 = 0.00E+00,
B20 = 0.00E+00

[Fresnel Data]

| Zone | Valley Coordinate y | Valley Coordinate z | Mountain Coordinate y | Mountain Coordinate z | Pitch |
|---|---|---|---|---|---|
| 1-2 | 9.6008 | −1.7968 | 9.6508 | −1.4153 | 9.60 |
| 2-3 | 11.9393 | −2.3659 | 11.9987 | −1.9932 | 2.34 |
| 3-4 | 13.6438 | −2.8019 | 13.7094 | −2.4363 | 1.70 |
| 4-5 | 15.0395 | −3.1685 | 15.1095 | −2.8090 | 1.40 |
| 5-6 | 16.2448 | −3.4906 | 16.3183 | −3.1364 | 1.21 |
| 6-7 | 17.3188 | −3.7810 | 17.3950 | −3.4317 | 1.07 |
| 7-8 | 18.2956 | −4.0477 | 18.3740 | −3.7028 | 0.98 |
| 8-9 | 19.1974 | −4.2956 | 19.2776 | −3.9547 | 0.90 |
| 9-10 | 20.0394 | −4.5284 | 20.1210 | −4.1912 | 0.84 |
| 10-11 | 20.8326 | −4.7489 | 20.9153 | −4.4150 | 0.79 |
| 11-12 | 21.5853 | −4.9589 | 21.6690 | −4.6280 | 0.75 |
| 12-13 | 22.3040 | −5.1602 | 22.3884 | −4.8320 | 0.72 |
| 13-14 | 22.9938 | −5.3541 | 23.0788 | −5.0283 | 0.69 |
| 14-15 | 23.6589 | −5.5414 | 23.7443 | −5.2179 | 0.67 |
| 15-16 | 24.3027 | −5.7232 | 24.3883 | −5.4016 | 0.64 |
| 16-17 | 24.9279 | −5.9002 | 25.0137 | −5.5803 | 0.63 |
| 17-18 | 25.5369 | −6.0729 | 25.6227 | −5.7545 | 0.61 |
| 18-19 | 26.1316 | −6.2419 | 26.2174 | −5.9248 | 0.59 |
| 19-20 | 26.7136 | −6.4076 | 26.7993 | −6.0915 | 0.58 |
| 20-21 | 27.2842 | −6.5702 | 27.3696 | −6.2551 | 0.57 |
| 21-22 | 27.8444 | −6.7301 | 27.9294 | −6.4158 | 0.56 |
| 22-23 | 28.3948 | −6.8874 | 28.4793 | −6.5737 | 0.55 |
| 23-24 | 28.9358 | −7.0422 | 29.0198 | −6.7291 | 0.54 |
| 24-25 | 29.4676 | −7.1946 | 29.5510 | −6.8819 | 0.53 |
| 25-26 | 29.9900 | −7.3444 | 30.0726 | −7.0321 | 0.52 |
| 26-27 | 30.5026 | −7.4916 | 30.5844 | −7.1796 | 0.51 |
| 27-28 | 31.0048 | −7.6359 | 31.0856 | −7.3243 | 0.50 |
| 28-29 | 31.4957 | −7.7771 | 31.5754 | −7.4659 | 0.49 |
| 29-30 | 31.9743 | −7.9148 | 32.0528 | −7.6041 | 0.48 |
| 30-31 | 32.4394 | −8.0488 | 32.5166 | −7.7387 | 0.47 |
| 31-32 | 32.8900 | −8.1787 | 32.9658 | −7.8692 | 0.45 |

[Conditional Expression Corresponding Value]

Conditional Expression (1) PAE1/PAC1 = 0.34
Conditional Expression (2) PAE2/PAC1 = 0.48
Conditional Expression (3) PAE3/PAC1 = 0.45
Conditional Expression (4) PAC1 = 2.02
Conditional Expression (5) PMX1/PMN1 = 21.31
Conditional Expression (6) PMX2/PMN2 = 5.63
Conditional Expression (7) PMX3/PMN3 = 1.37
Conditional Expression (8) QE1/QC1 = 4.5
Conditional Expression (9) QE2/QC1 = 2.5

TABLE 1-continued

Conditional Expression (10) $k_d$ = −12.45
Conditional Expression (11) $k_r$ = −1.48(>$k_d$)

Figure 3:
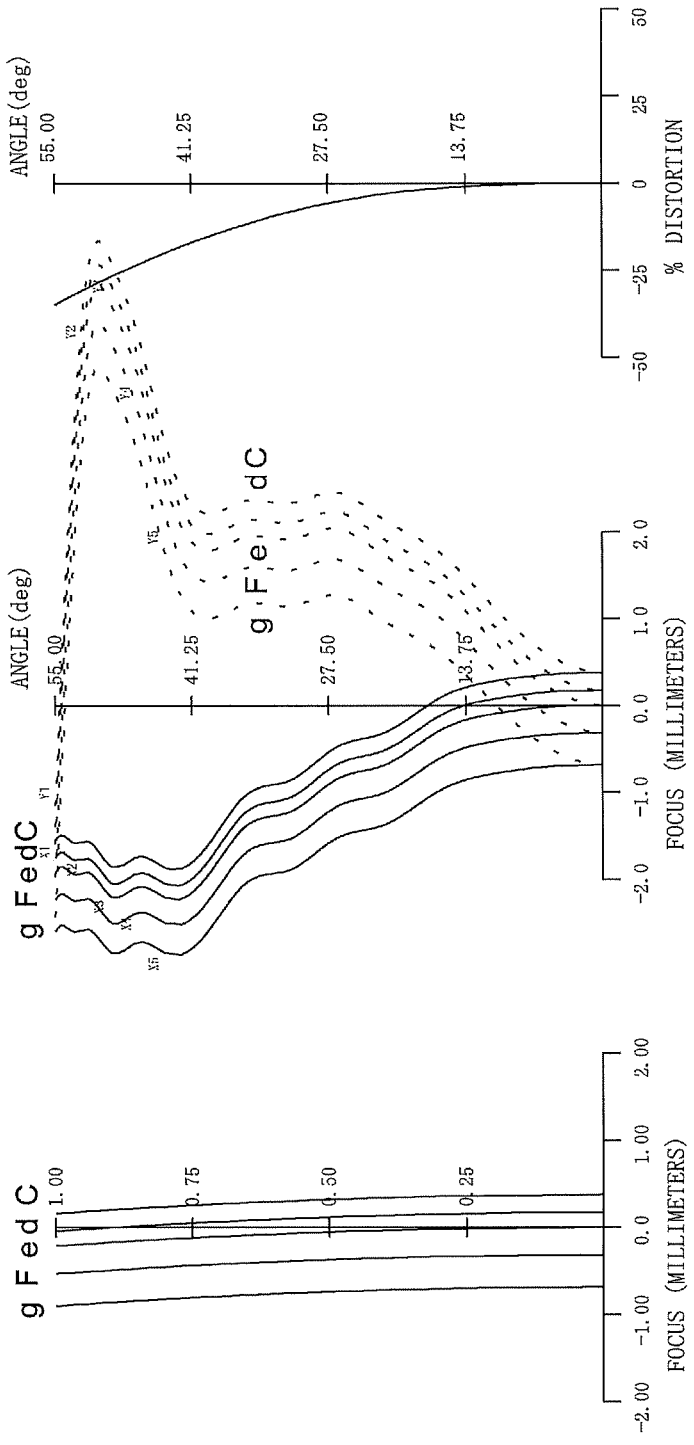
FIG. 3 shows various aberration graphs of the ocular optical system according to the first example.
Figure 4:
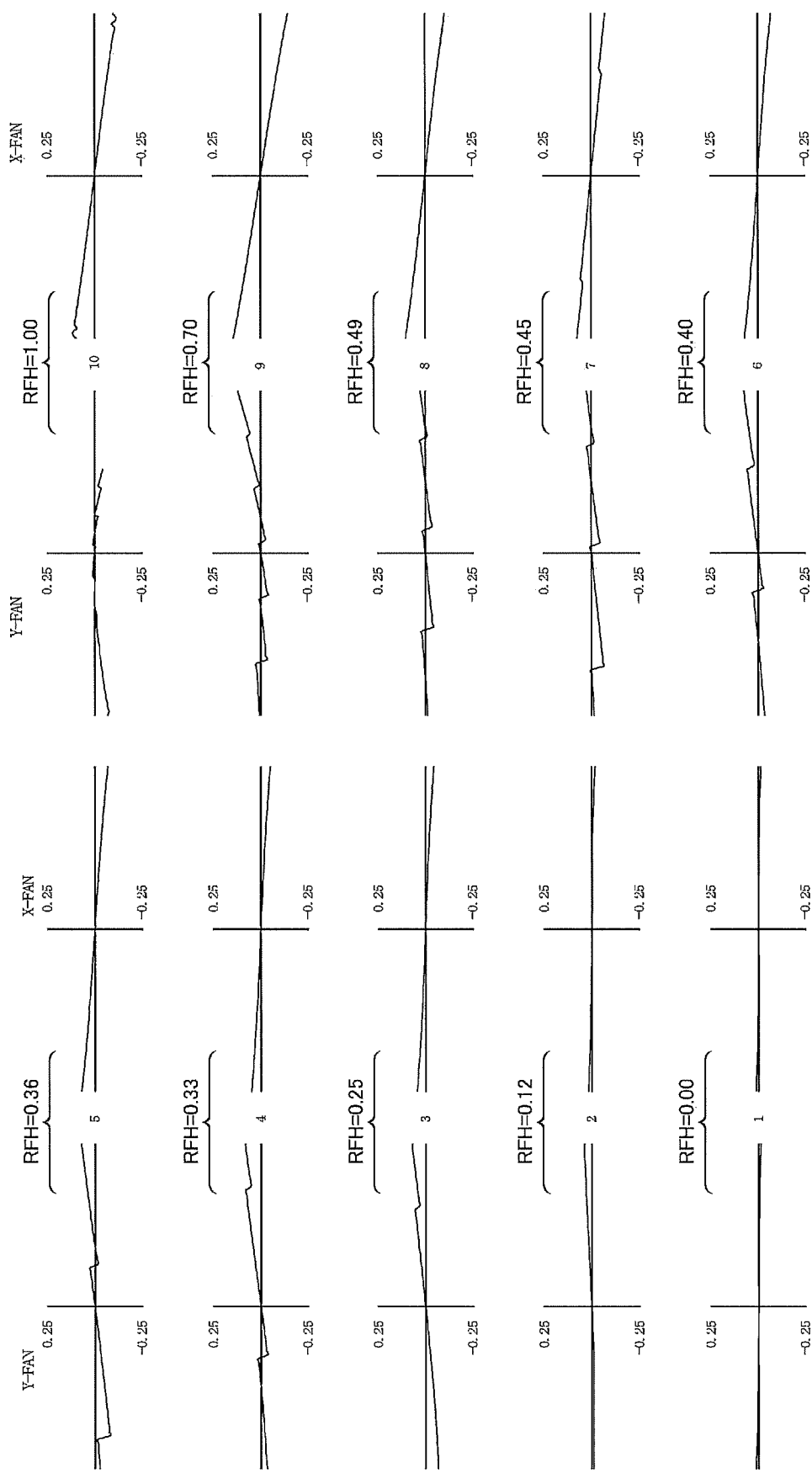
FIG. 4 shows a lateral aberration graph of the ocular optical system according to the first example.
Figure 5:
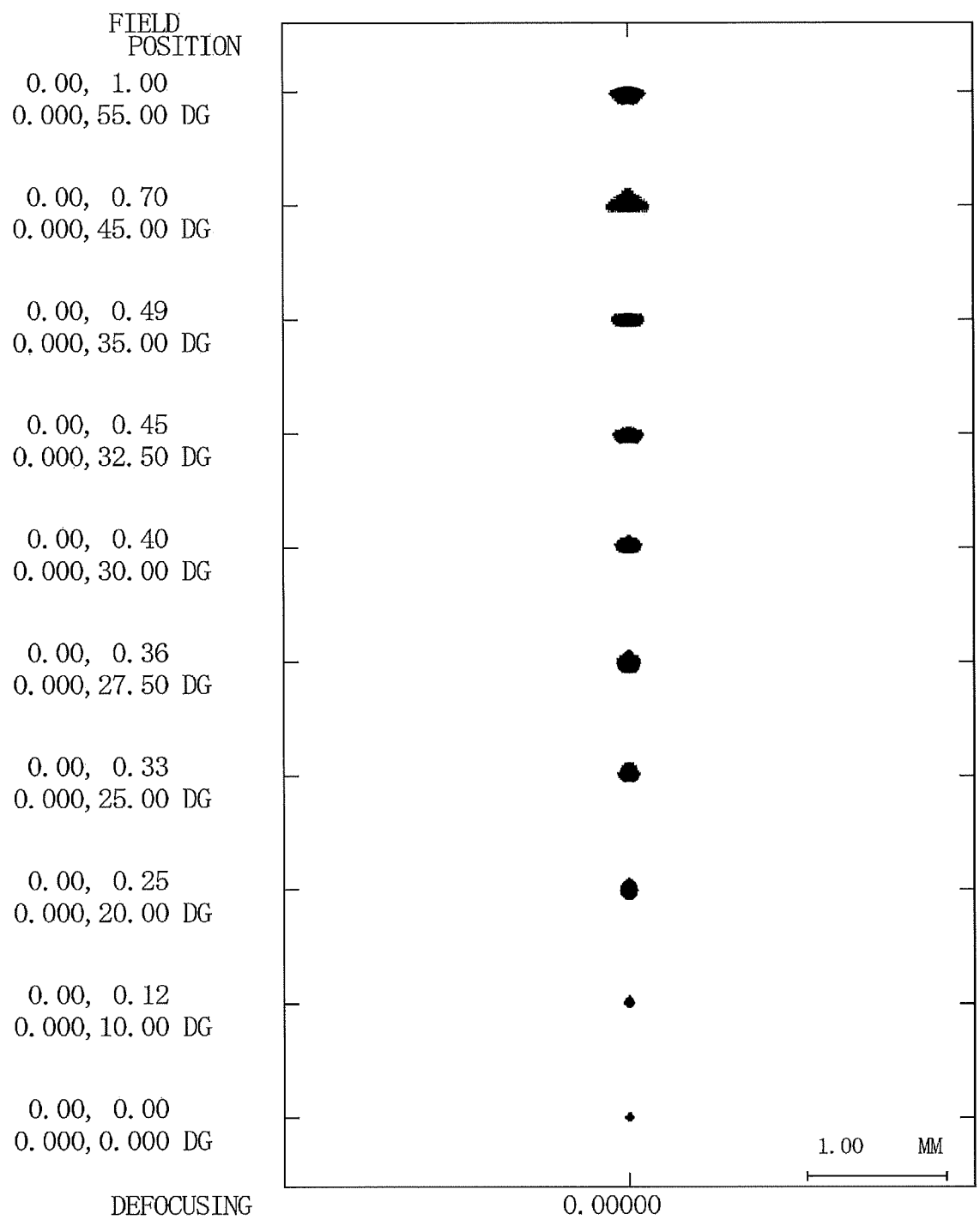
FIG. 5 is a spot diagram of the ocular optical system according to the first example.

FIG. 3 shows various aberration graphs of the ocular optical system according to the first example. FIG. 4 shows a lateral aberration graph of the ocular optical system according to the first example. FIG. 5 is a spot diagram of the ocular optical system according to the first example. In each aberration graph, d represents d-line (wavelength λ=587.6 nm), e represents e-line (wavelength λ=546.1 nm), g represents g-line (wavelength λ=435.8 nm), C represents C-line (wavelength λ=656.3 nm), and F represents F-line (wavelength λ=486.1 nm). In the astigmatism diagram, a solid line represents a sagittal image surface, and a broken line represents a meridional image surface. In the lateral aberration graph, RFH represents an image height ratio (Relative Field Height). In the spot diagram, the vertical axis shows a field position, and the horizontal axis shows a defocus amount.

Figure 6:
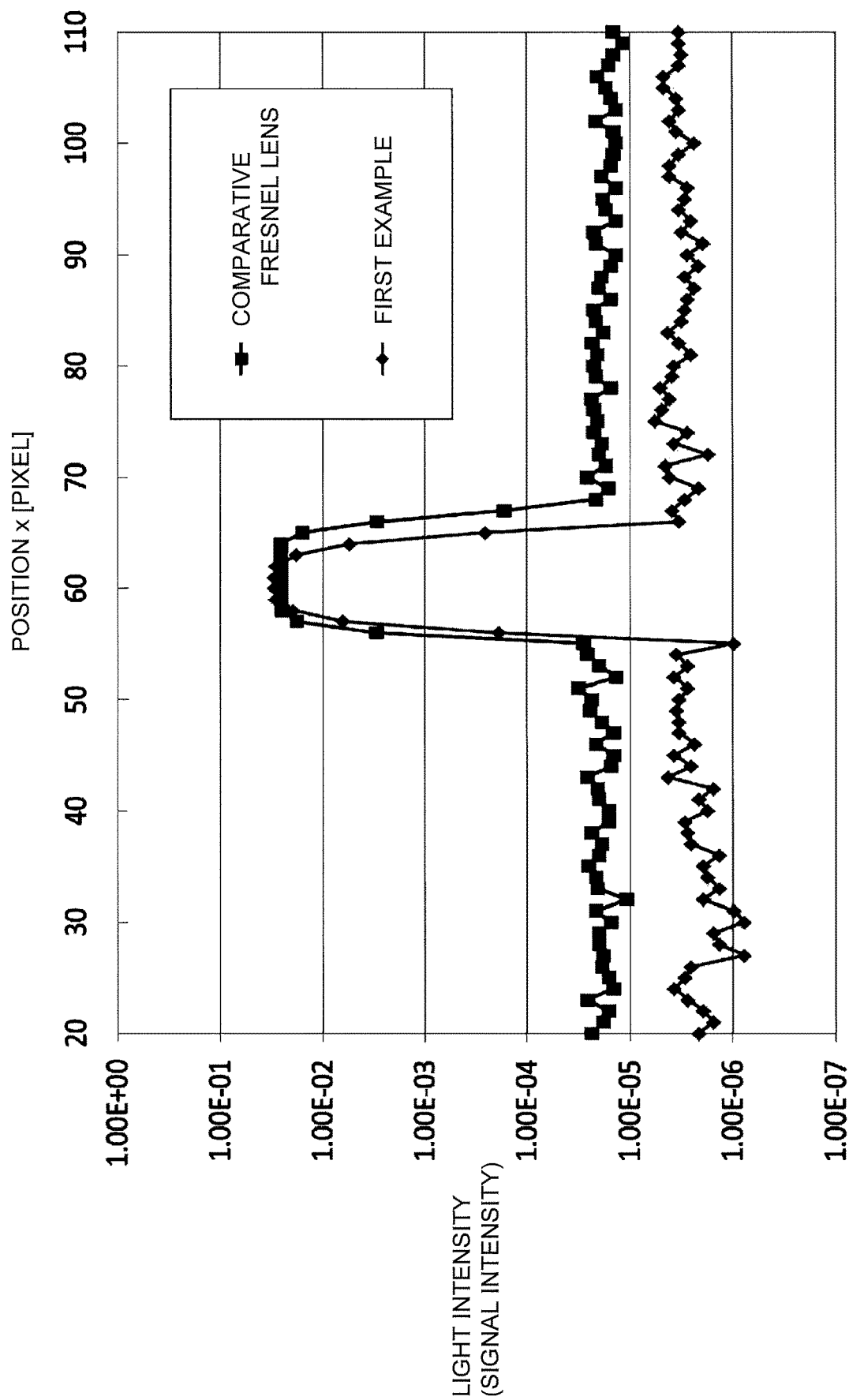
FIG. 6 is a flare comparative diagram of the ocular optical system according to the first example.

FIG. 6 is a flare comparative diagram of the ocular optical system according to the first example. Here, a method of measuring flare shown in FIG. 6 will be described. A measuring device shown in FIG. 32A is assumed as a device for measuring the flare shown in FIG. 6, and the flare was calculated by a light beam tracing simulation. The measuring device shown in FIG. 32A comprises, in order from a light source, a point light source Pm, ocular optical systems EL {EL(1) to EL(5)} as lenses under test, an aperture stop Sm, a measuring optical system Lm, and a light receiver Dm. The aperture stop Sm is arranged at the position of the eyepoint EP in the ocular optical system EL. The aperture stop Sm corresponds to an iris diaphragm of a human eye. A character θ in FIG. 32A represents the angle of a light beam incident on the human eye.

Light from the point light source Pm passes through the ocular optical system EL as the lens under test, is restricted by the aperture stop Sm, passes through the measuring optical system Lm, and then reaches the light receiver Dm. Signal values of the light from the point light source Pm and the flare can be calculated based on a detection signal of the light detected by the light receiver Dm. When the signal values are calculated, the point light source Pm is made large enough to clarify a range indicating the signal value of the light from the point light source Pm. The vertex portions of the second and subsequent Fresnel zones FR counted from the central axis side of the Fresnel lens L1 out of the plurality of Fresnel zones FR do not have perfect edge shapes, but actually have rounded shapes as shown in FIG. 32B. Therefore, when the signal value is calculated, the approximation is performed so that the radiuses of curvature Rm of the vertex portions of the second and subsequent Fresnel zones FR are set to 50 μm. The signal values (signal intensities) of the light from the point light source Pm and the flare which are calculated according to light beam tracing by using such a measuring device are shown in the flare comparative diagram of FIG. 6.

In the flare comparative diagram of FIG. 6, the light intensity (signal intensity) on the vertical axis is standardized so that the signal intensity corresponding to the light intensity of emission light emitted from the point light source Pm is 1, and is logarithmically displayed. The position x on the horizontal axis is a relative position on a light receiving surface in the light receiver Dm. A relatively high signal intensity in a region where the position x is about 55 to 65 [pixels] indicates the signal intensity of the light from the point light source Pm, and a relatively low signal intensity in a region out of the former region indicates the signal intensity of the flare.

Note that the signal values (signal intensities) of light from the point light source Pm and the flare which were calculated by the light beam tracing simulation using a comparative Fresnel lens as a lens under test as indicated by a two-dotted chain line in FIG. 31 are shown as comparative data. The comparative Fresnel lens is a Fresnel lens in which a plurality of Fresnel zones are arranged concentrically along a spherical surface. As is apparent from FIG. 31, the number of discontinuous portions (wall surface portions) of the Fresnel zones in the comparative Fresnel lens is smaller than that of the conventional Fresnel lens, and larger than that of the Fresnel lens L1 according to each example. Therefore, if the flare calculated when the ocular optical system EL {EL(1) to EL(5)} according to each example is used as the lens under test is smaller than the flare calculated when the comparative Fresnel lens is used as the lens under test, from the correlation of the number of discontinuous portions (wall surface portions) of the Fresnel zones, it is possible to evaluate that the flare is reduced as compared with the conventional Fresnel lens.

Note that in the aberration graph and flare comparative diagram of each example shown below, the same numerals and characters as those of the present example are used, and duplicate description thereof is omitted. It is apparent from each aberration graph and the flare comparative diagram that in the first example, various aberrations are successfully corrected, flare is reduced as compared with the conventional Fresnel lens, and excellent image formation performance is obtained.

Second Example

Figure 7:
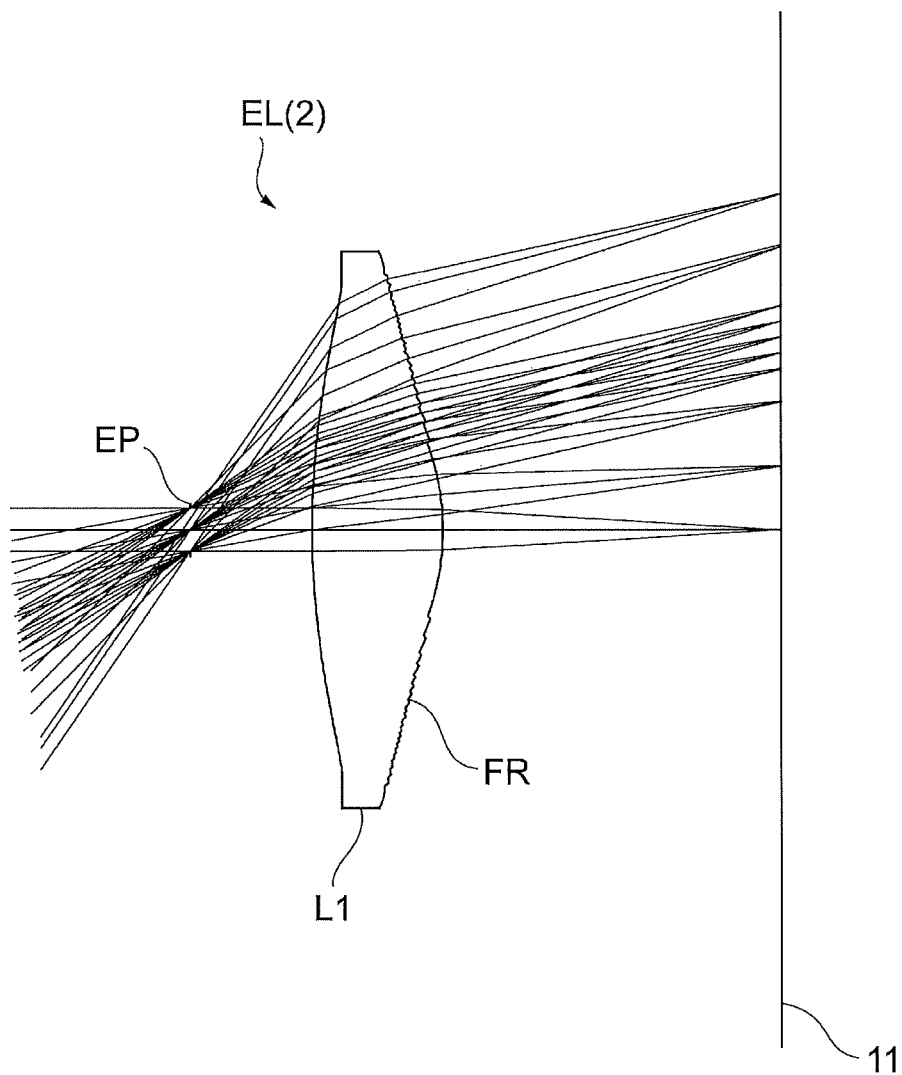
FIG. 7 is a lens configuration diagram of an ocular optical system according to a second example.

A second example will be described with reference to FIGS. 7 to 12 and Table 2. FIG. 7 is a diagram showing a lens configuration of an ocular optical system according to the second example of the present embodiment. The ocular optical system EL (2) according to the second example comprises a biconvex Fresnel lens L1 having a positive refractive power.

Figure 8:
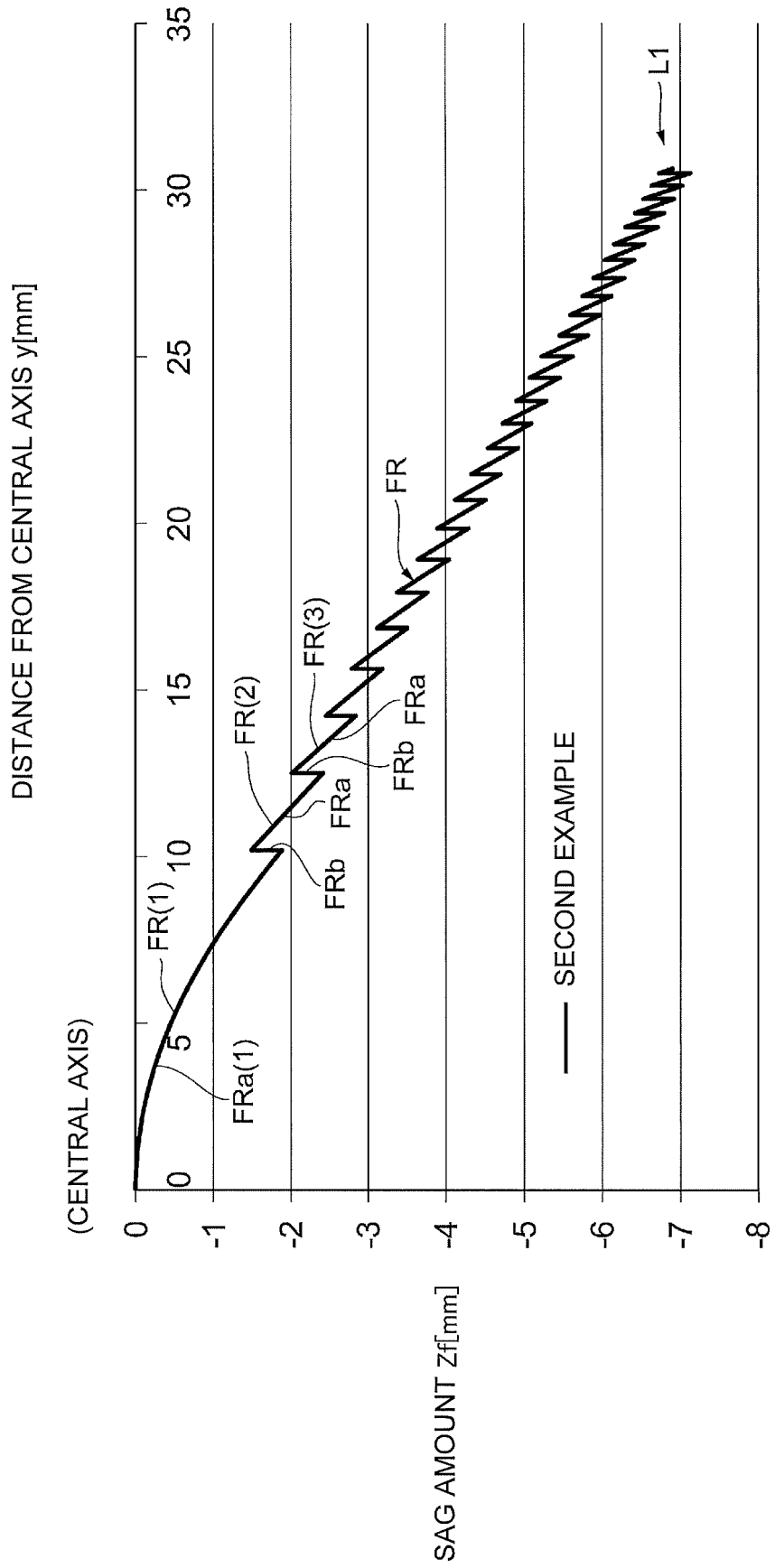
FIG. 8 is an enlarged view showing the shape of a Fresnel lens of the ocular optical system according to the second example.

An aspherical surface is formed on the lens surface on an eyepoint EP side of the Fresnel lens L1. A plurality of Fresnel zones FR are formed on the lens surface on an image display part 11 side (observation object side) of the Fresnel lens L1. As shown in FIG. 8, the first Fresnel zone FR (1) located on the most central axis side of the Fresnel lens L1 out of the plurality of Fresnel zones FR is formed in a disk shape coaxial with the central axis of the Fresnel lens L1. The first Fresnel zone FR (1) has a Fresnel surface portion FRa (1) having an aspherical shape. The second and subsequent Fresnel zones FR counted from the central axis side of the Fresnel lens L1 out of the plurality of Fresnel zones FR are formed in an annular shape coaxial with the central axis of the Fresnel lens L1. The second and subsequent Fresnel zones FR each have an aspherical Fresnel surface portion FRa and a stepped and wall-shaped wall surface portion FRb. The vertex portions of the respective Fresnel zones FR are arranged side by side along the above-mentioned arrangement reference aspherical surface.

The following Table 2 lists specification values of the ocular optical system according to the second example.

TABLE 2

[Specification Data]

f = 41.96
ω = ±55°
ER = 14.30
TL = 69.29
DA = 64.00
PAC1 = 2.03
PAE1 = 0.65
PAE2 = 1.00
PAE3 = 1.12
PMX1 = 10.20
PMN1 = 0.29
PMX2 = 10.20
PMN2 = 1.71
PMX3 = 2.34
PMN3 = 1.71
QC1 = 2
QE1 = 8
QE2 = 5

[Lens Data]

| Surface Number | R | D | vd | nd |
|---|---|---|---|---|
| 1*a | 94.1114448 | 15.40 | 56.46 | 1.5273 |
| 2*b | −27.28884363 | 39.59 | | |

[Aspherical Surface Data]

1st Surface k = −2.02
C4 = 0.00E+00, C6 = −4.33E−09, C8 = 8.40E−12,
C10 = −6.13E−15, C12 = 5.79E−19
C14 = 0.00E+00, C16 = 0.00E+00, C18 = 0.00E+00,
C20 = 0.00E+00

2nd Surface (arrangement reference aspherical surface)

kd = −14.00
A4 = 0.00E+00, A6 = 0.00E+00, A8 = 0.00E+00,
A10 = 0.00E+00, A12 = 0.00E+00
A14 = 0.00E+00, A16 = 0.00E+00, A18 = 0.00E+00,
A20 = 0.00E+00

2nd Surface (shape reference aspherical surface)

kr = −1.67
B4 = 0.00E+00, B6 = −1.37E−08, B8 = 2.32E−11,
B10 = −1.29E−14, B12 = 0.00E+00
B14 = 0.00E+00, B16 = 0.00E+00, B18 = 0.00E+00,
B20 = 0.00E+00

[Fresnel Data]

| Zone | Valley Coordinate y | Valley Coordinate z | Mountain Coordinate y | Mountain Coordinate z | Pitch |
|---|---|---|---|---|---|
| 1-2 | 10.1972 | −1.8757 | 10.2499 | −1.4949 | 10.20 |
| 2-3 | 12.5364 | −2.4251 | 12.5984 | −2.0529 | 2.34 |
| 3-4 | 14.2489 | −2.8444 | 14.3169 | −2.4791 | 1.71 |
| 4-5 | 15.6527 | −3.1960 | 15.7251 | −2.8367 | 1.40 |
| 5-6 | 16.8664 | −3.5043 | 16.9421 | −3.1503 | 1.21 |
| 6-7 | 17.9492 | −3.7823 | 18.0275 | −3.4330 | 1.08 |
| 7-8 | 18.9358 | −4.0376 | 19.0162 | −3.6926 | 0.99 |
| 8-9 | 19.8485 | −4.2753 | 19.9306 | −3.9341 | 0.91 |
| 9-10 | 20.7025 | −4.4988 | 20.7859 | −4.1610 | 0.85 |
| 10-11 | 21.5085 | −4.7106 | 21.5930 | −4.3760 | 0.81 |
| 11-12 | 22.2744 | −4.9126 | 22.3597 | −4.5809 | 0.77 |
| 12-13 | 23.0058 | −5.1062 | 23.0916 | −4.7770 | 0.73 |
| 13-14 | 23.7067 | −5.2921 | 23.7930 | −4.9654 | 0.70 |
| 14-15 | 24.3800 | −5.4712 | 24.4665 | −5.1468 | 0.67 |
| 15-16 | 25.0275 | −5.6438 | 25.1140 | −5.3215 | 0.65 |
| 16-17 | 25.6501 | −5.8100 | 25.7365 | −5.4899 | 0.62 |
| 17-18 | 26.2482 | −5.9700 | 26.3343 | −5.6520 | 0.60 |
| 18-19 | 26.8216 | −6.1236 | 26.9072 | −5.8078 | 0.57 |
| 19-20 | 27.3699 | −6.2707 | 27.4548 | −5.9572 | 0.55 |
| 20-21 | 27.8926 | −6.4111 | 27.9767 | −6.1000 | 0.52 |
| 21-22 | 28.3893 | −6.5447 | 28.4725 | −6.2362 | 0.50 |
| 22-23 | 28.8598 | −6.6713 | 28.9419 | −6.3656 | 0.47 |

TABLE 2-continued

| | | | | | |
|---|---|---|---|---|---|
| 23-24 | 29.3042 | −6.7911 | 29.3852 | −6.4883 | 0.44 |
| 24-25 | 29.7232 | −6.9040 | 29.8028 | −6.6043 | 0.42 |
| 25-26 | 30.1173 | −7.0104 | 30.1956 | −6.7139 | 0.39 |
| 26-27 | 30.4878 | −7.1104 | 30.5647 | −6.8173 | 0.37 |
| 27-28 | 30.8360 | −7.2045 | 30.9114 | −6.9148 | 0.35 |
| 28-29 | 31.1631 | −7.2929 | 31.2370 | −7.0068 | 0.33 |
| 29-30 | 31.4707 | −7.3761 | 31.5431 | −7.0935 | 0.31 |
| 30-31 | 31.7601 | −7.4544 | 31.8311 | −7.1754 | 0.29 |

[Conditional Expression Corresponding Value]

Conditional Expression (1) PAE1/PAC1 = 0.32
Conditional Expression (2) PAE2/PAC1 = 0.50
Conditional Expression (3) PAE3/PAC1 = 0.55
Conditional Expression (4) PAC1 = 2.03
Conditional Expression (5) PMX1/PMN1 = 35.23
Conditional Expression (6) PMX2/PMN2 = 5.95
Conditional Expression (7) PMX3/PMN3 = 1.37
Conditional Expression (8) QE1/QC1 = 4.0
Conditional Expression (9) QE2/QC1 = 2.5
Conditional Expression (10) $k_d$ = −14.00
Conditional Expression (11) $k_r$ = −1.67(>$k_d$)

Figure 9:
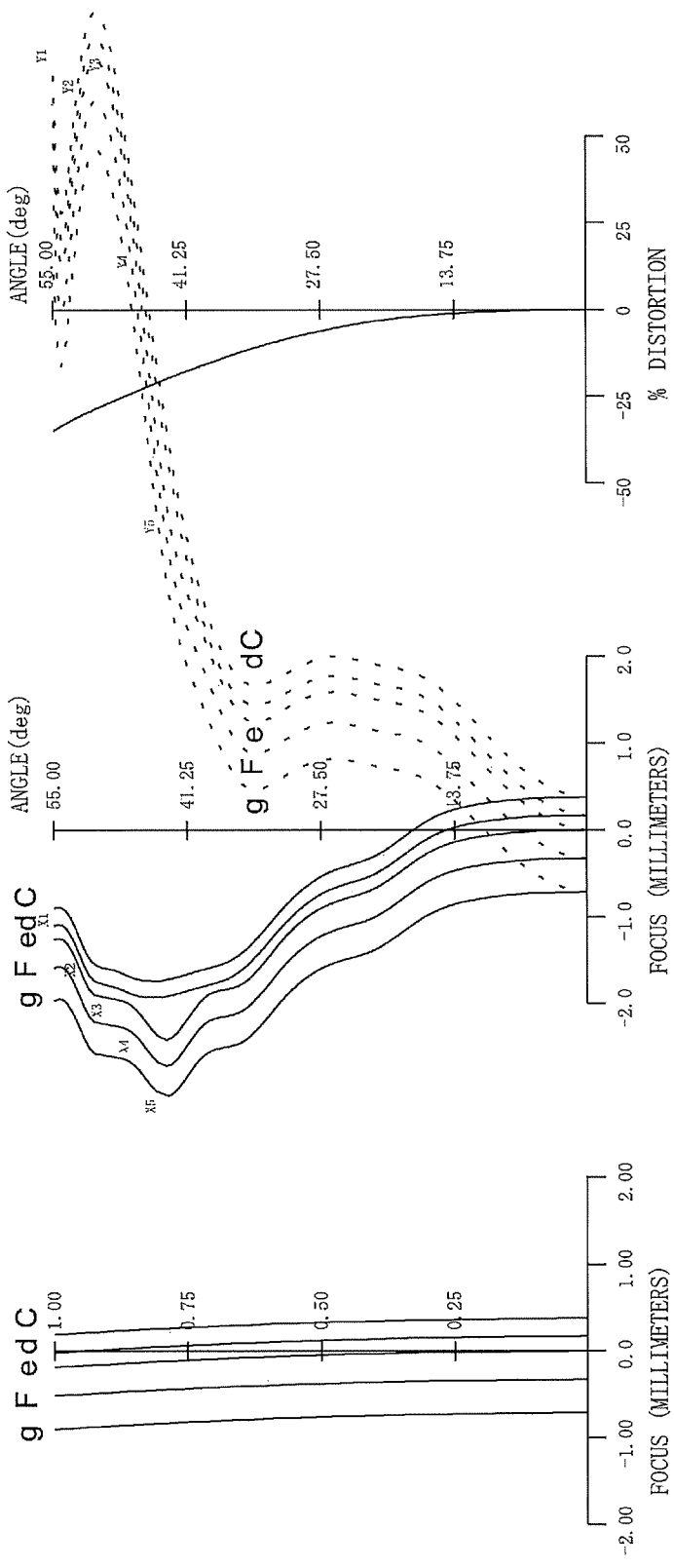
FIG. 9 shows various aberration graphs of the ocular optical system according to the second example.
Figure 10:
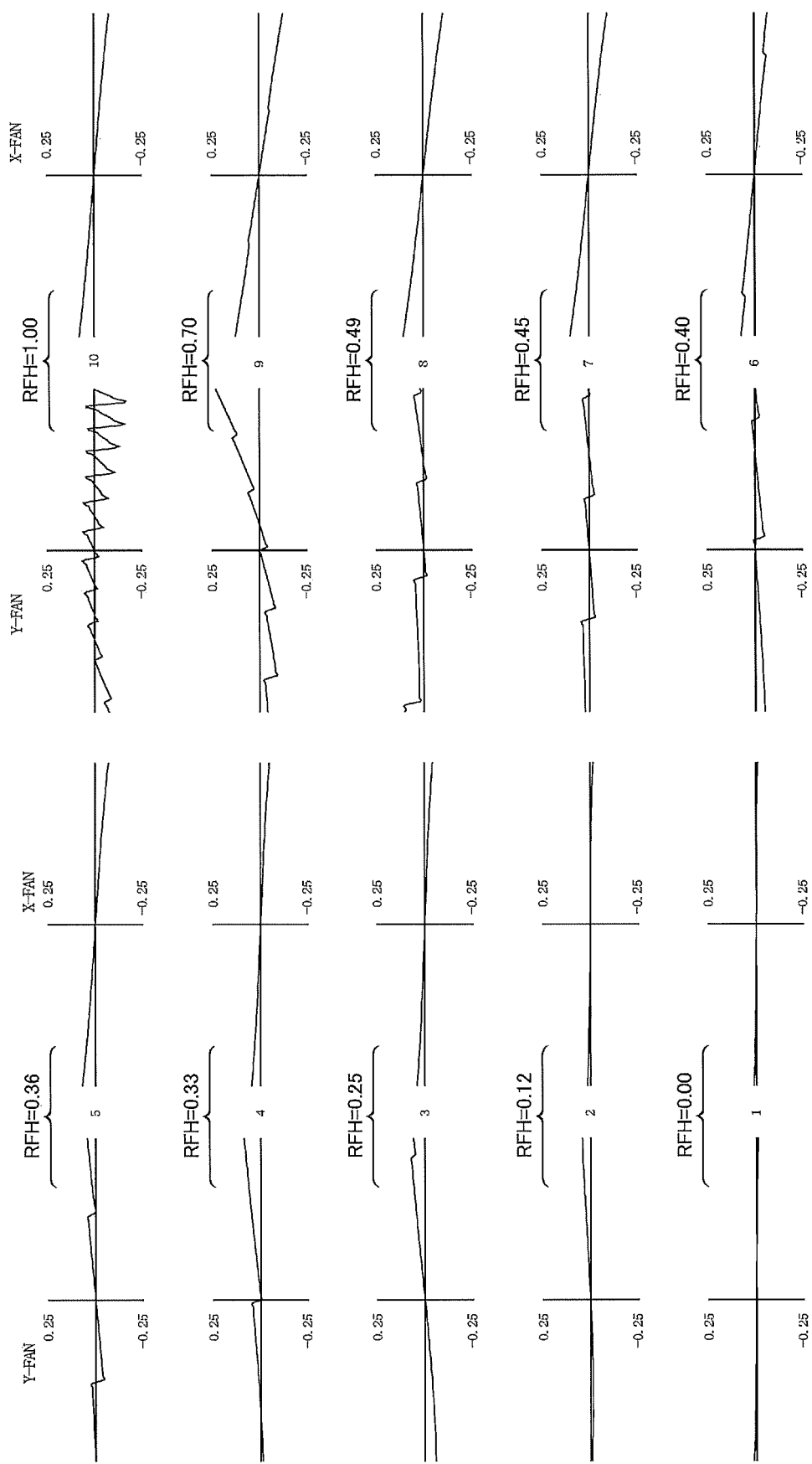
FIG. 10 shows a lateral aberration graph of the ocular optical system according to the second example.
Figure 11:
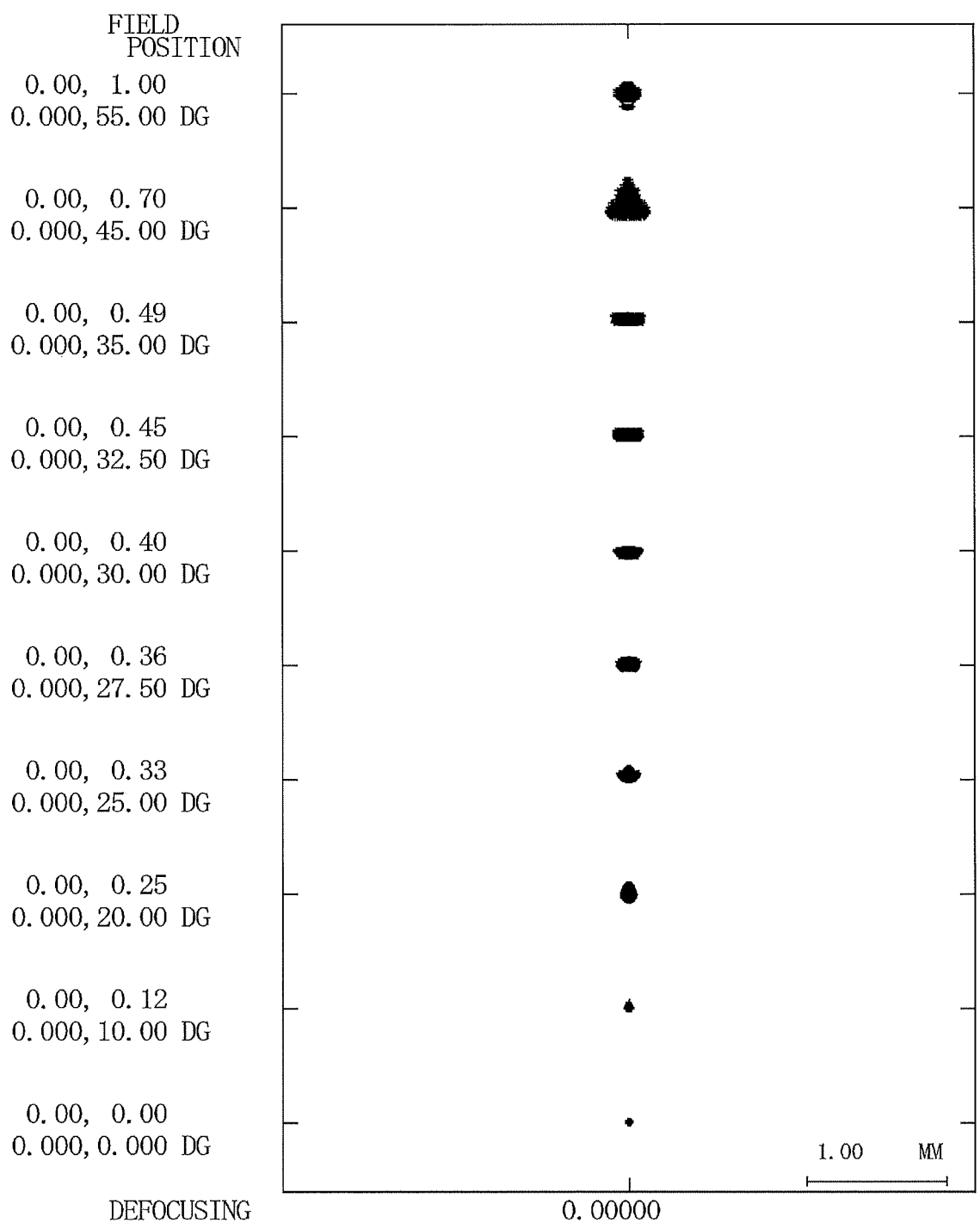
FIG. 11 is a spot diagram of the ocular optical system according to the second example.
Figure 12:
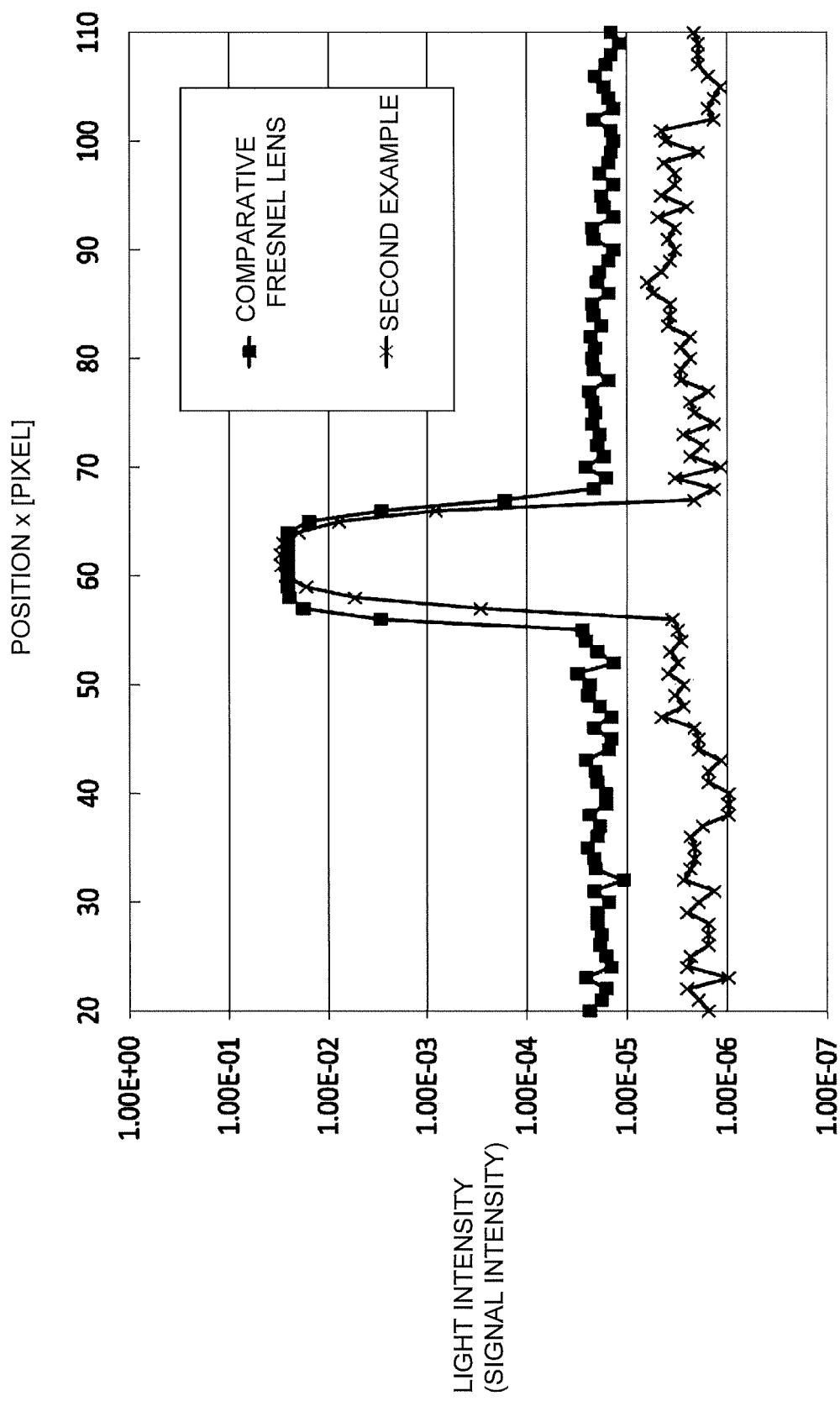
FIG. 12 is a flare comparative diagram of the ocular optical system according to the second example.

FIG. 9 shows various aberration graphs of the ocular optical system according to the second example. FIG. 10 shows a lateral aberration graph of the ocular optical system according to the second example. FIG. 11 is a spot diagram of the ocular optical system according to the second example. FIG. 12 is a flare comparative diagram of the ocular optical system according to the second example. From each aberration graph and the flare comparative diagram, it is apparent that in the second example, various aberrations are successfully corrected, flare is also reduced as compared with the conventional Fresnel lens, and excellent image formation performance is obtained.

Third Example

Figure 13:
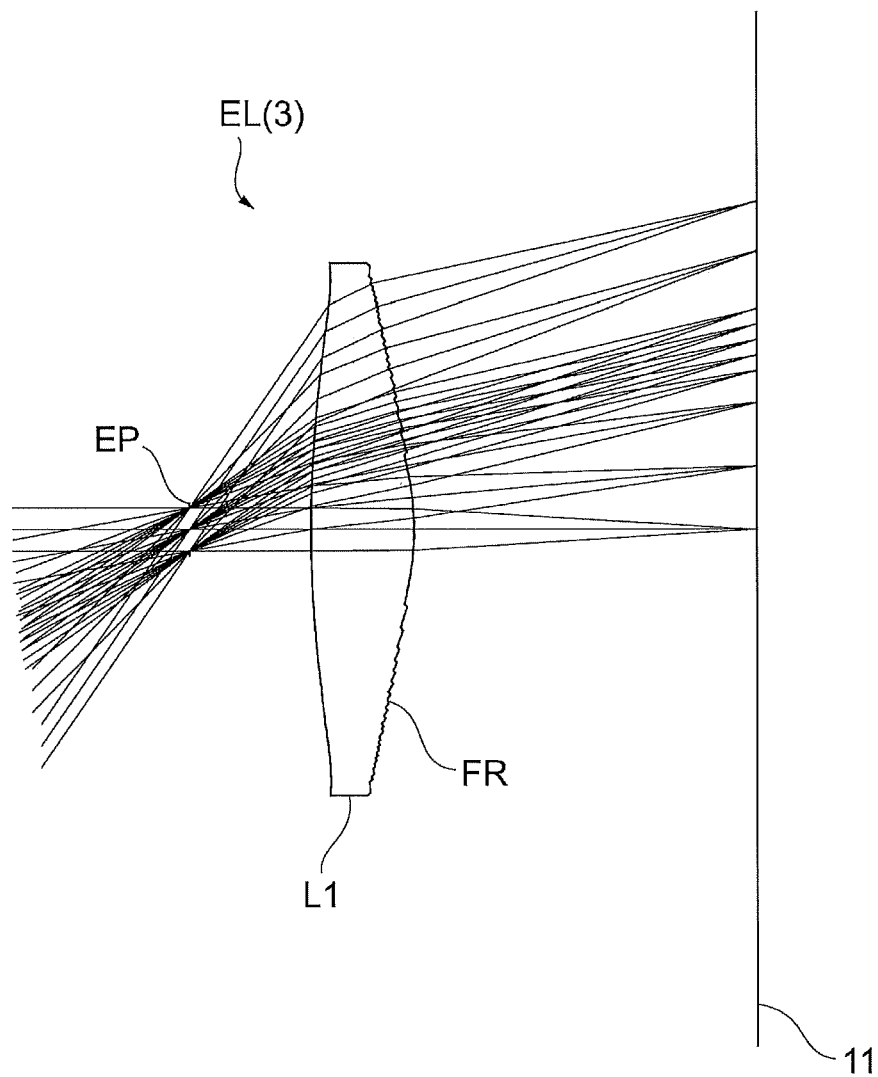
FIG. 13 is a lens configuration diagram of an ocular optical system according to a third example.

A third example will be described with reference to FIGS. 13 to 18 and Table 3. FIG. 13 is a diagram showing a lens configuration of an ocular optical system according to the third example of the present embodiment. The ocular optical system EL (3) according to the third example comprises a biconvex Fresnel lens L1 having a positive refractive power.

Figure 14:
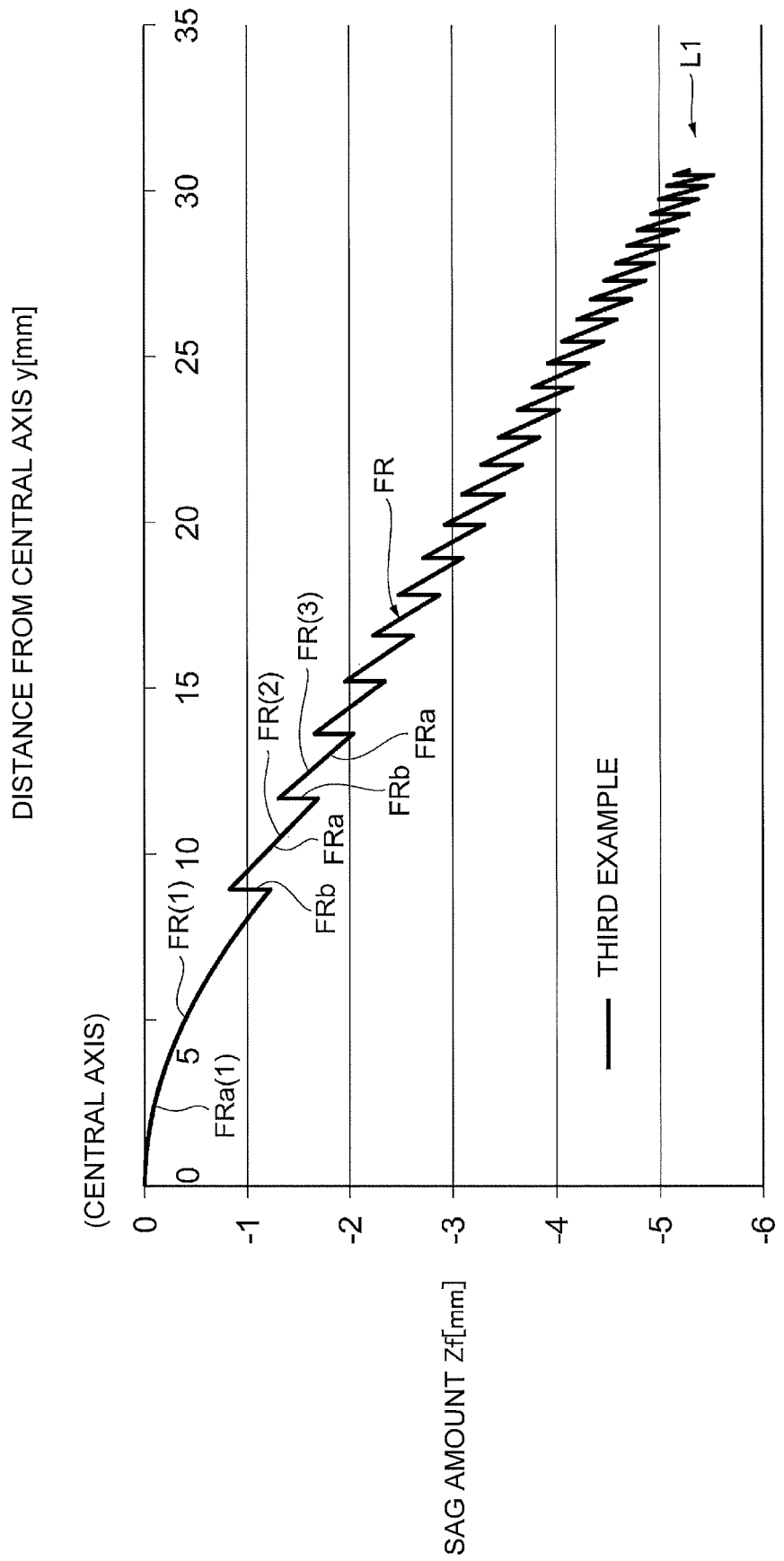
FIG. 14 is an enlarged view showing the shape of a Fresnel lens of the ocular optical system according to the third example.

An aspherical surface is formed on the lens surface on the eyepoint EP side of the Fresnel lens L1. A plurality of Fresnel zones FR are formed on the lens surface on the image display part 11 side (observation object side) of the Fresnel lens L1. As shown in FIG. 14, the first Fresnel zone FR (1) located on the most central axis side of the Fresnel lens L1 out of the plurality of Fresnel zones FR is formed in a disk shape coaxial with the central axis of the Fresnel lens L1. The first Fresnel zone FR (1) has a Fresnel surface portion FRa (1) having an aspherical shape. The second and subsequent Fresnel zones FR counted from the central axis side of the Fresnel lens L1 out of the plurality of Fresnel zones FR are formed in an annular shape coaxial with the central axis of the Fresnel lens L1. The second and subsequent Fresnel zones FR each have an aspherical Fresnel surface portion FRa and a stepped and wall-shaped wall surface portion FRb. The vertex portions of the respective Fresnel zones FR are arranged side by side along the above-mentioned arrangement reference aspherical surface.

The following Table 3 lists specification values of the ocular optical system according to the third example.

TABLE 3

[Specification Data]

f = 41.82
ω = ±55°
ER = 14.30
TL = 66.83
DA = 64.00
PAC1 = 2.37
PAE1 = 0.70
PAE2 = 1.16
PAE3 = 1.26
PMX1 = 8.90
PMN1 = 0.28
PMX2 = 8.90
PMN2 = 1.97
PMX3 = 2.76
PMN3 = 1.97
QC1 = 2
QE1 = 7
QE2 = 5

[Lens Data]

| Surface Number | R | D | vd | nd |
|---|---|---|---|---|
| 1*a | 142.1977939 | 12.10 | 23.89 | 1.6417 |
| 2*b | −31.98001155 | 40.43 | | |

[Aspherical Surface Data]

1st Surface k = 18.64
C4 = 0.00E+00, C6 = −4.59E−09, C8 = 2.76E−12,
C10 = 3.29E−15, C12 = −5.20E−18
C14 = 0.00E+00, C16 = 0.00E+00, C18 = 0.00E+00,
C20 = 0.00E+00

2nd Surface (arrangement reference aspherical surface)

kd = −20.34
A4 = 0.00E+00, A6 = 0.00E+00, A8 = 0.00E+00,
A10 = 0.00E+00, A12 = 0.00E+00
A14 = 0.00E+00, A16 = 0.00E+00, A18 = 0.00E+00,
A20 = 0.00E+00

2nd Surface (shape reference aspherical surface)

kr = −1.72
B4 = 0.00E+00, B6 = −9.08E−09, B8 = 1.46E−11,
B10 = −8.80E−15, B12 = 0.00E+00
B14 = 0.00E+00, B16 = 0.00E+00, B18 = 0.00E+00,
B20 = 0.00E+00

[Fresnel Data]

| Zone | Valley Coordinate y | Valley Coordinate z | Mountain Coordinate y | Mountain Coordinate z | Pitch |
|---|---|---|---|---|---|
| 1-2 | 8.8989 | −1.2252 | 8.9463 | −0.8382 | 8.90 |
| 2-3 | 11.6559 | −1.6936 | 11.7150 | −1.3148 | 2.76 |
| 3-4 | 13.6301 | −2.0578 | 13.6968 | −1.6857 | 1.97 |
| 4-5 | 15.2287 | −2.3652 | 15.3008 | −1.9990 | 1.60 |
| 5-6 | 16.5985 | −2.6355 | 16.6748 | −2.2746 | 1.37 |
| 6-7 | 17.8116 | −2.8794 | 17.8911 | −2.5232 | 1.21 |
| 7-8 | 18.9094 | −3.1030 | 18.9914 | −2.7512 | 1.10 |
| 8-9 | 19.9182 | −3.3107 | 20.0021 | −2.9628 | 1.01 |
| 9-10 | 20.8555 | −3.5054 | 20.9410 | −3.1610 | 0.94 |
| 10-11 | 21.7336 | −3.6889 | 21.8202 | −3.3479 | 0.88 |
| 11-12 | 22.5611 | −3.8630 | 22.6485 | −3.5250 | 0.83 |
| 12-13 | 23.3442 | −4.0285 | 23.4321 | −3.6934 | 0.78 |
| 13-14 | 24.0873 | −4.1863 | 24.1755 | −3.8539 | 0.74 |
| 14-15 | 24.7934 | −4.3368 | 24.8817 | −4.0071 | 0.71 |
| 15-16 | 25.4647 | −4.4803 | 25.5528 | −4.1532 | 0.67 |
| 16-17 | 26.1025 | −4.6170 | 26.1902 | −4.2926 | 0.64 |
| 17-18 | 26.7078 | −4.7472 | 26.7950 | −4.4254 | 0.61 |
| 18-19 | 27.2813 | −4.8707 | 27.3678 | −4.5516 | 0.57 |
| 19-20 | 27.8238 | −4.9879 | 27.9094 | −4.6716 | 0.54 |
| 20-21 | 28.3360 | −5.0987 | 28.4206 | −4.7853 | 0.51 |
| 21-22 | 28.8189 | −5.2033 | 28.9023 | −4.8929 | 0.48 |
| 22-23 | 29.2736 | −5.3019 | 29.3557 | −4.9947 | 0.45 |

TABLE 3-continued

| 23-24 | 29.7013 | −5.3949 | 29.7821 | −5.0909 | 0.43 |
| 24-25 | 30.1036 | −5.4824 | 30.1830 | −5.1816 | 0.40 |
| 25-26 | 30.4818 | −5.5648 | 30.5598 | −5.2674 | 0.38 |
| 26-27 | 30.8377 | −5.6423 | 30.9142 | −5.3483 | 0.36 |
| 27-28 | 31.1728 | −5.7154 | 31.2478 | −5.4248 | 0.34 |
| 28-29 | 31.4885 | −5.7844 | 31.5621 | −5.4971 | 0.32 |
| 29-30 | 31.7864 | −5.8495 | 31.8586 | −5.5656 | 0.30 |

[Conditional Expression Corresponding Value]

Conditional Expression (1) PAE1/PAC1 = 0.30
Conditional Expression (2) PAE2/PAC1 = 0.49
Conditional Expression (3) PAE3/PAC1 = 0.53
Conditional Expression (4) PAC1 = 2.37
Conditional Expression (5) PMX1/PMN1 = 31.61
Conditional Expression (6) PMX2/PMN2 = 4.51
Conditional Expression (7) PMX3/PMN3 = 1.40
Conditional Expression (8) QE1/QC1 = 3.5
Conditional Expression (9) QE2/QC1 = 2.5
Conditional Expression (10) $k_d$ = −20.34
Conditional Expression (11) $k_r$ = −1.72(>$k_d$)

Figure 15:
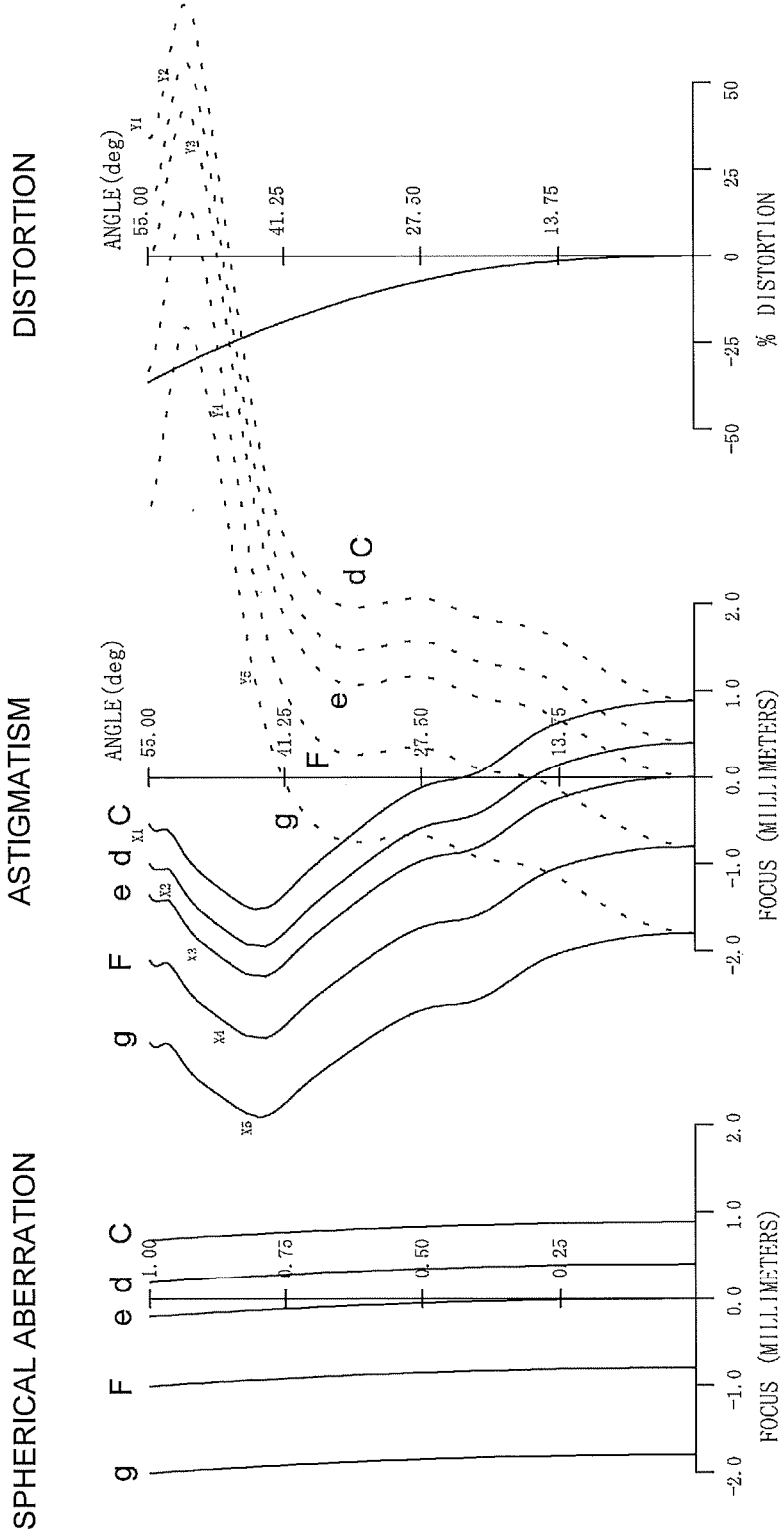
FIG. 15 shows various aberration graphs of the ocular optical system according to the third example.
Figure 16:
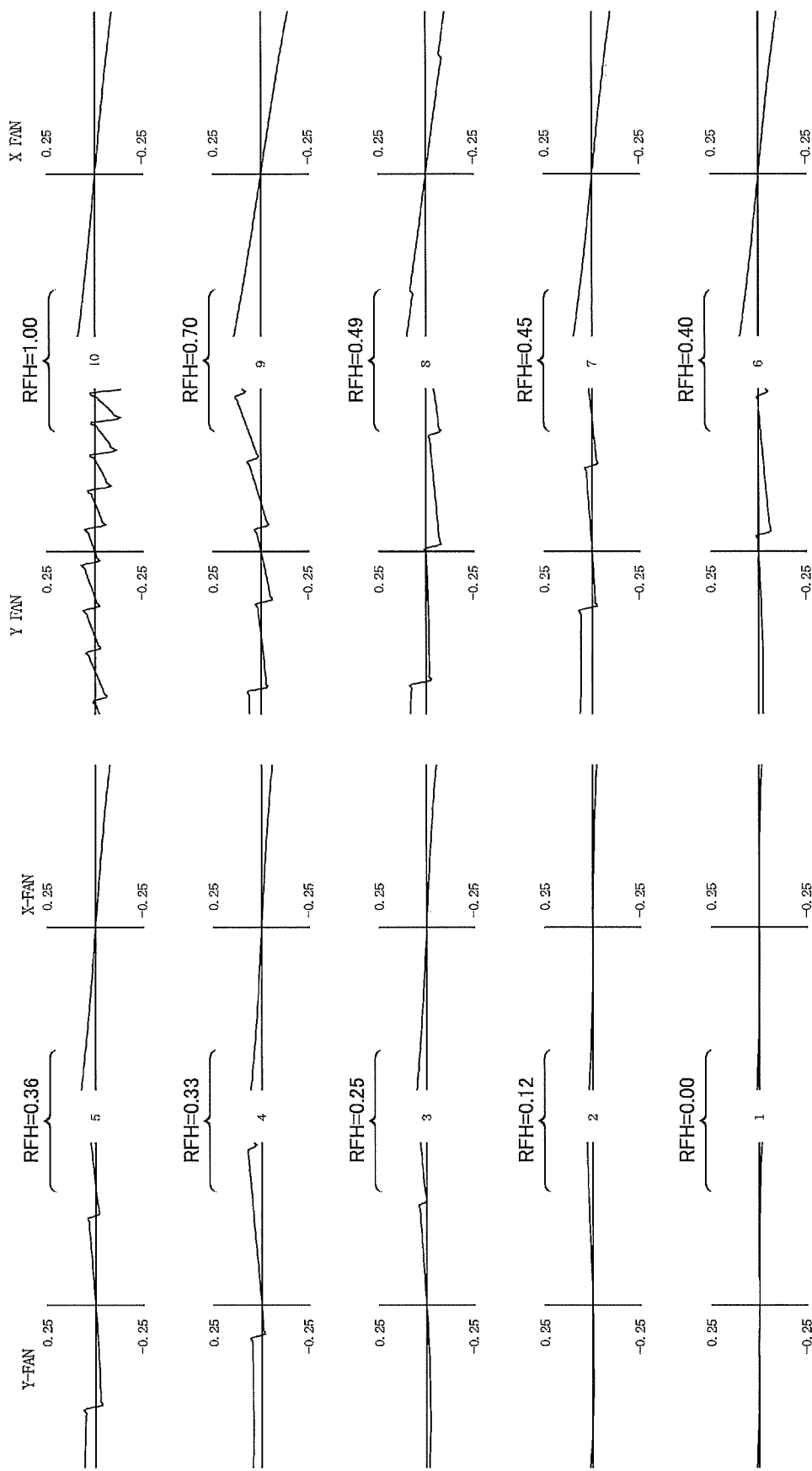
FIG. 16 shows a lateral aberration graph of the ocular optical system according to the third example.
Figure 17:
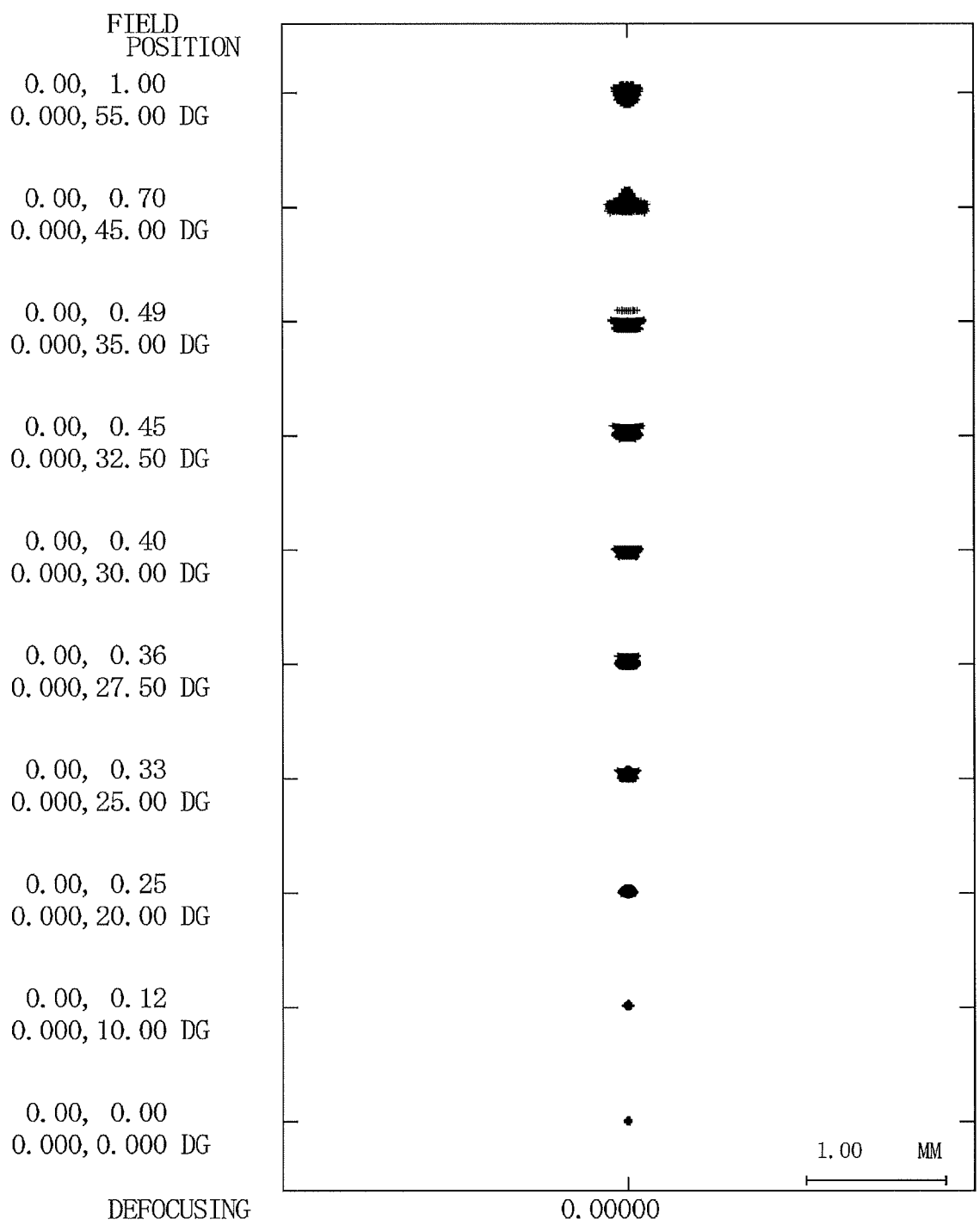
FIG. 17 is a spot diagram of the ocular optical system according to the third example.
Figure 18:
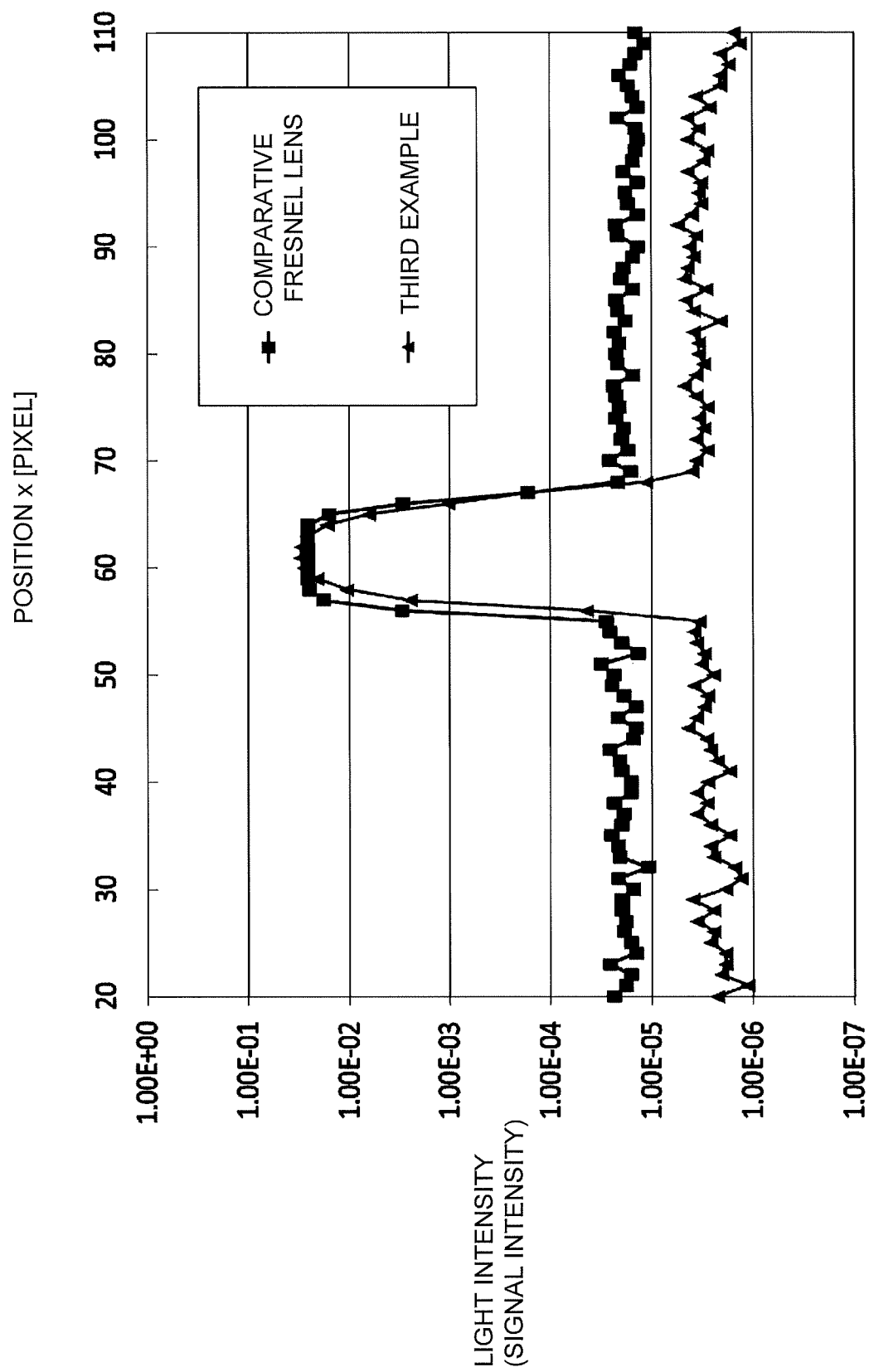
FIG. 18 is a flare comparative diagram of the ocular optical system according to the third example.

FIG. 15 shows various aberration graphs of the ocular optical system according to the third example. FIG. 16 shows a lateral aberration graph of the ocular optical system according to the third example. FIG. 17 is a spot diagram of the ocular optical system according to the third example. FIG. 18 is a flare comparative diagram of the ocular optical system according to the third example. From each aberration graph and the flare comparative diagram, it is apparent in the third example that various aberrations are successfully corrected, flare is reduced as compared with the conventional Fresnel lens, and excellent image formation performance is obtained.

Fourth Example

Figure 19:
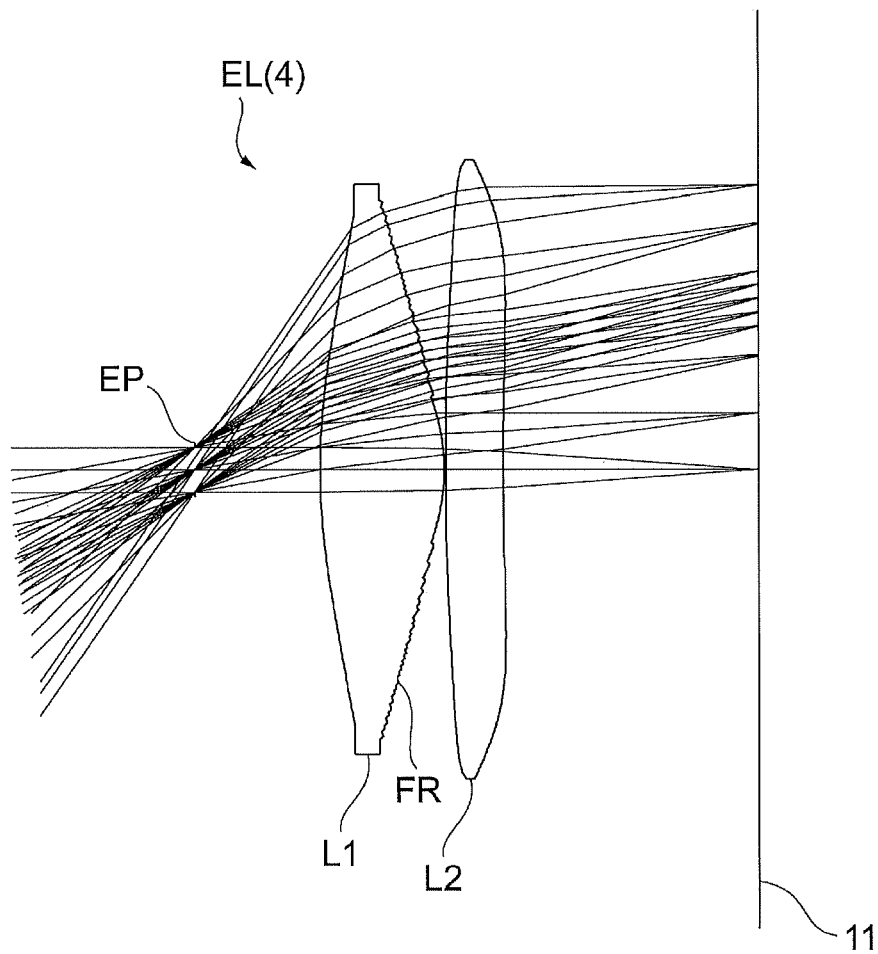
FIG. 19 is a lens configuration diagram of an ocular optical system according to a fourth example.

A fourth example will be described with reference to FIGS. 19 to 24 and Table 4. FIG. 19 is a diagram showing a lens configuration of an ocular optical system according to a fourth example of the present embodiment. The ocular optical system EL (4) according to the fourth example comprises, in order from an eyepoint EP, a biconvex Fresnel lens L1 having a positive refractive power, and an aspherical lens L2 having aspherical lens surfaces on both sides thereof.

Figure 20:
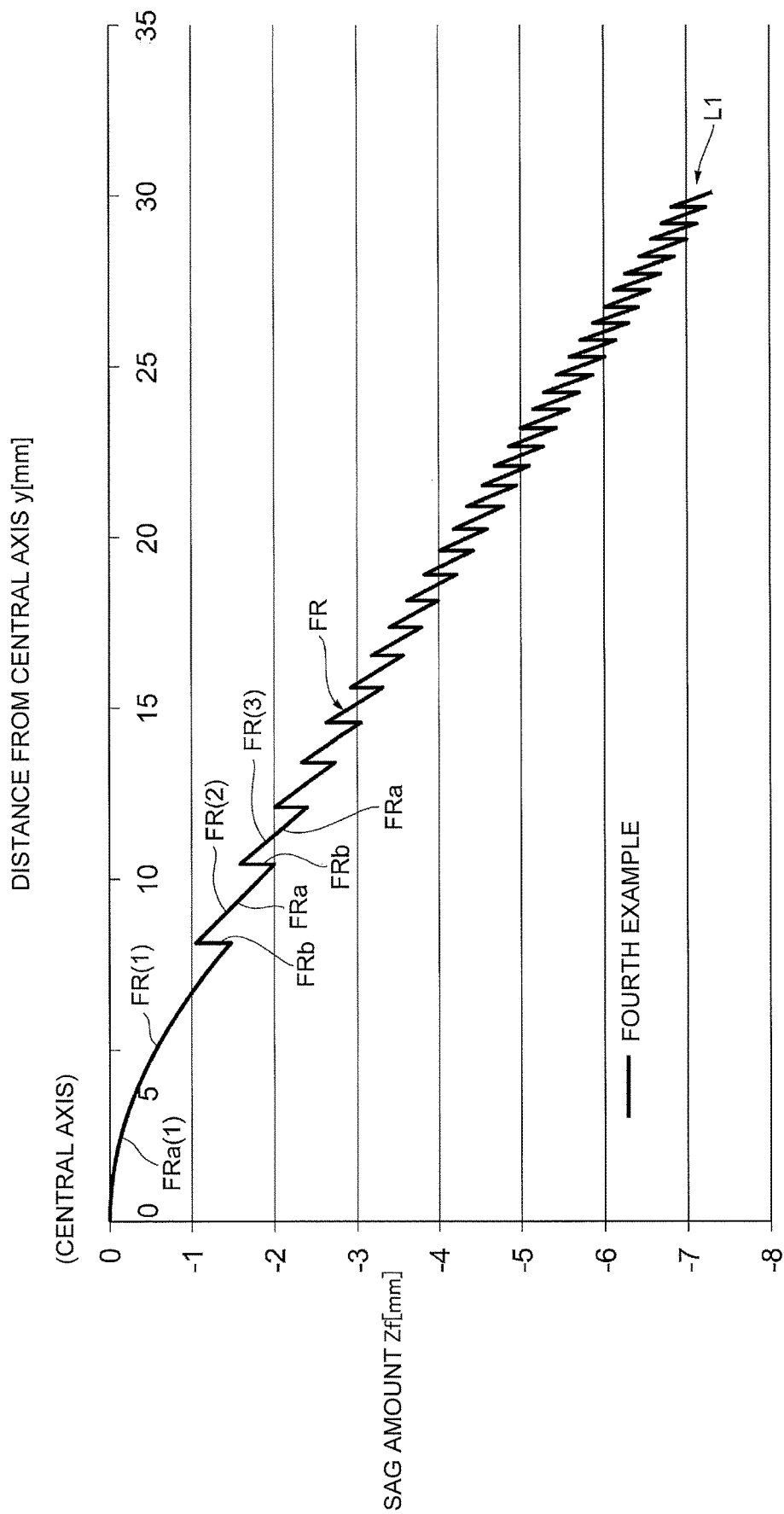
FIG. 20 is an enlarged view showing the shape of a Fresnel lens of the ocular optical system according to the fourth example.

An aspherical surface is formed on the lens surface on an eyepoint EP side of the Fresnel lens L1. A plurality of Fresnel zones FR are formed on the lens surface on an image display part 11 side (observation object side) of the Fresnel lens L1. As shown in FIG. 20, the first Fresnel zone FR (1) located on the most central axis side of the Fresnel lens L1 out of the plurality of Fresnel zones FR is formed in a disk shape coaxial with the central axis of the Fresnel lens L1. The first Fresnel zone FR (1) has a Fresnel surface portion FRa (1) having an aspherical shape. The second and subsequent Fresnel zones FR counted from the central axis side of the Fresnel lens L1 out of the plurality of Fresnel zones FR are formed in an annular shape coaxial with the central axis of the Fresnel lens L1. The second and subsequent Fresnel zones FR each have an aspherical Fresnel surface portion FRa and a stepped and wall-shaped wall surface portion FRb. The vertex portions of the respective Fresnel zones FR are arranged side by side along the above-mentioned arrangement reference aspherical surface.

The following Table 4 lists specification values of the ocular optical system according to the fourth example.

TABLE 4

[Specification Data]

f = 35.80
ω = ±55°
ER = 14.30
TL = 63.80
DA = 62.00
PAC1 = 1.62
PAE1 = 0.59
PAE2 = 0.75
PAE3 = 0.83
PMX1 = 8.13
PMN1 = 0.49
PMX2 = 8.13
PMN2 = 1.15
PMX3 = 2.31
PMN3 = 1.15
QC1 = 4
QE1 = 10
QE2 = 6

[Lens Data]

| Surface Number | R | D | vd | nd |
|---|---|---|---|---|
| 1*a | 72.11677126 | 14.00 | 57.07 | 1.4929 |
| 2*b | −22.23898 | 0.14 | | |
| 3*a | 344.5294151 | 6.51 | 57.07 | 1.4929 |
| 4*a | 407.0421741 | 28.85 | | |

[Aspherical Surface Data]

1st Surface k = −3.92
C4 = 0.00E+00, C6 = −9.21E−09, C8 = 1.20E−11,
C10 = −2.09E−15, C12 = −2.57E−18
C14 = 0.00E+00, C16 = 0.00E+00, C18 = 0.00E+00,
C20 = 0.00E+00

2nd Surface (arrangement reference aspherical surface)

kd = −12.45
A4 = 0.00E+00, A6 = 0.00E+00, A8 = 0.00E+00,
A10 = 0.00E+00, A12 = 0.00E+00
A14 = 0.00E+00, A16 = 0.00E+00, A18 = 0.00E+00,
A20 = 0.00E+00

2nd Surface (shape reference aspherical surface)

kr = −1.58
B4 = 0.00E+00, B6 = −1.77E−08, B8 = 2.29E−11,
B10 = −8.01E−15, B12 = 0.00E+00
B14 = 0.00E+00, B16 = 0.00E+00, B18 = 0.00E+00,
B20 = 0.00E+00

3rd Surface k = 100.00
C4 = 0.00E+00, C6 = −1.11E−09, C8 = 3.55E−13,
C10 = 5.83E−17, C12 = 0.00E+00
C14 = 0.00E+00, C16 = 0.00E+00, C18 = 0.00E+00,
C20 = 0.00E+00

4th Surface k = −100.00
C4 = 0.00E+00, C6 = −2.18E−09, C8 = −3.24E−12,
C10 = 2.36E−15, C12 = 0.00E+00
C14 = 0.00E+00, C16 = 0.00E+00, C18 = 0.00E+00,
C20 = 0.00E+00

[Fresnel Data]

| Zone | Valley Coordinate y | Valley Coordinate z | Mountain Coordinate y | Mountain Coordinate z | Pitch |
|---|---|---|---|---|---|
| 1-2 | 8.1313 | −1.4634 | 8.1704 | −1.0773 | 8.13 |
| 2-3 | 10.4394 | −1.9962 | 10.4883 | −1.6184 | 2.31 |
| 3-4 | 12.0991 | −2.4061 | 12.1547 | −2.0353 | 1.66 |
| 4-5 | 13.4457 | −2.7505 | 13.5064 | −2.3860 | 1.35 |
| 5-6 | 14.5998 | −3.0522 | 14.6646 | −2.6934 | 1.15 |
| 6-7 | 15.6207 | −3.3233 | 15.6889 | −2.9697 | 1.02 |

TABLE 4-continued

| | | | | |
|---|---|---|---|---|
| 7-8 | 16.5430 | −3.5709 | 16.6139 | −3.2223 | 0.92 |
| 8-9 | 17.3889 | −3.8001 | 17.4621 | −3.4561 | 0.85 |
| 9-10 | 18.1737 | −4.0143 | 18.2488 | −3.6746 | 0.78 |
| 10-11 | 18.9085 | −4.2160 | 18.9853 | −3.8804 | 0.73 |
| 11-12 | 19.6019 | −4.4073 | 19.6801 | −4.0754 | 0.69 |
| 12-13 | 20.2604 | −4.5898 | 20.3398 | −4.2614 | 0.66 |
| 13-14 | 20.8892 | −4.7647 | 20.9697 | −4.4395 | 0.63 |
| 14-15 | 21.4928 | −4.9331 | 21.5742 | −4.6110 | 0.60 |
| 15-16 | 22.0747 | −5.0959 | 22.1568 | −4.7766 | 0.58 |
| 16-17 | 22.6379 | −5.2540 | 22.7207 | −4.9371 | 0.56 |
| 17-18 | 23.1851 | −5.4079 | 23.2685 | −5.0933 | 0.55 |
| 18-19 | 23.7186 | −5.5583 | 23.8025 | −5.2457 | 0.53 |
| 19-20 | 24.2405 | −5.7057 | 24.3249 | −5.3950 | 0.52 |
| 20-21 | 24.7525 | −5.8505 | 24.8373 | −5.5414 | 0.51 |
| 21-22 | 25.2565 | −5.9934 | 25.3416 | −5.6856 | 0.50 |
| 22-23 | 25.7539 | −6.1346 | 25.8393 | −5.8279 | 0.50 |
| 23-24 | 26.2462 | −6.2745 | 26.3318 | −5.9688 | 0.49 |
| 24-25 | 26.7348 | −6.4136 | 26.8207 | −6.1086 | 0.49 |
| 25-26 | 27.2211 | −6.5522 | 27.3071 | −6.2476 | 0.49 |
| 26-27 | 27.7063 | −6.6907 | 27.7925 | −6.3863 | 0.49 |
| 27-28 | 28.1917 | −6.8294 | 28.2780 | −6.5250 | 0.49 |
| 28-29 | 28.6786 | −6.9686 | 28.7650 | −6.6641 | 0.49 |
| 29-30 | 29.1682 | −7.1088 | 29.2545 | −6.8038 | 0.49 |
| 30-31 | 29.6616 | −7.2502 | 29.7478 | −6.9446 | 0.49 |
| 31-32 | 30.1598 | −7.3932 | 30.2459 | −7.0866 | 0.50 |
| 32-33 | 30.6637 | −7.5379 | 30.7497 | −7.2303 | 0.50 |

[Conditional Expression Corresponding Value]

Conditional Expression (1) PAE1/PAC1 = 0.37
Conditional Expression (2) PAE2/PAC1 = 0.46
Conditional Expression (3) PAE3/PAC1 = 0.52
Conditional Expression (4) PAC1 = 1.62
Conditional Expression (5) PMX1/PMN1 = 16.76
Conditional Expression (6) PMX2/PMN2 = 7.05
Conditional Expression (7) PMX3/PMN3 = 2.00
Conditional Expression (8) QE1/QC1 = 2.5
Conditional Expression (9) QE2/QC1 = 1.5
Conditional Expression (10) $k_d$ = −12.45
Conditional Expression (11) $k_r$ = −1.58(>$k_d$)

Figure 21:
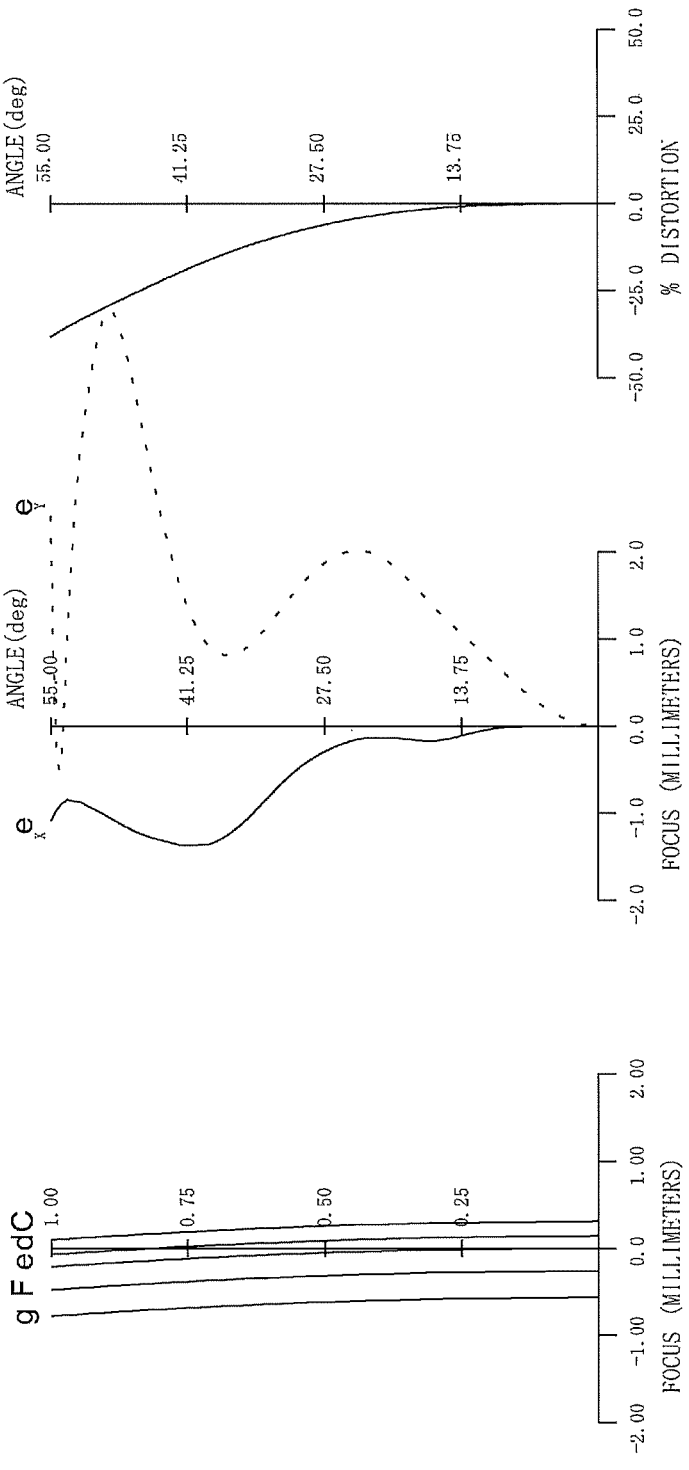
FIG. 21 shows various aberration graphs of the ocular optical system according to the fourth example.
Figure 22:
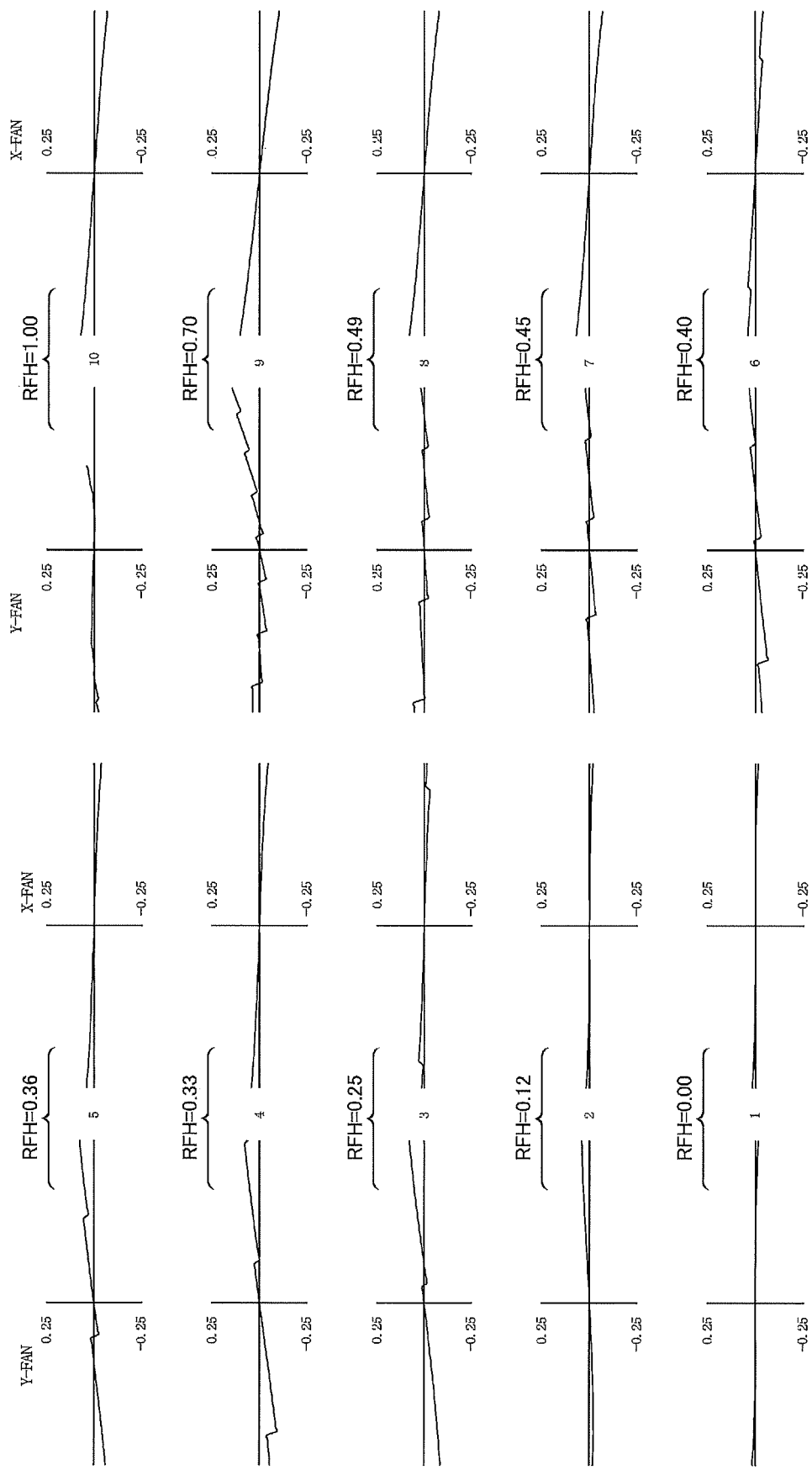
FIG. 22 shows a lateral aberration graph of the ocular optical system according to the fourth example.
Figure 23:
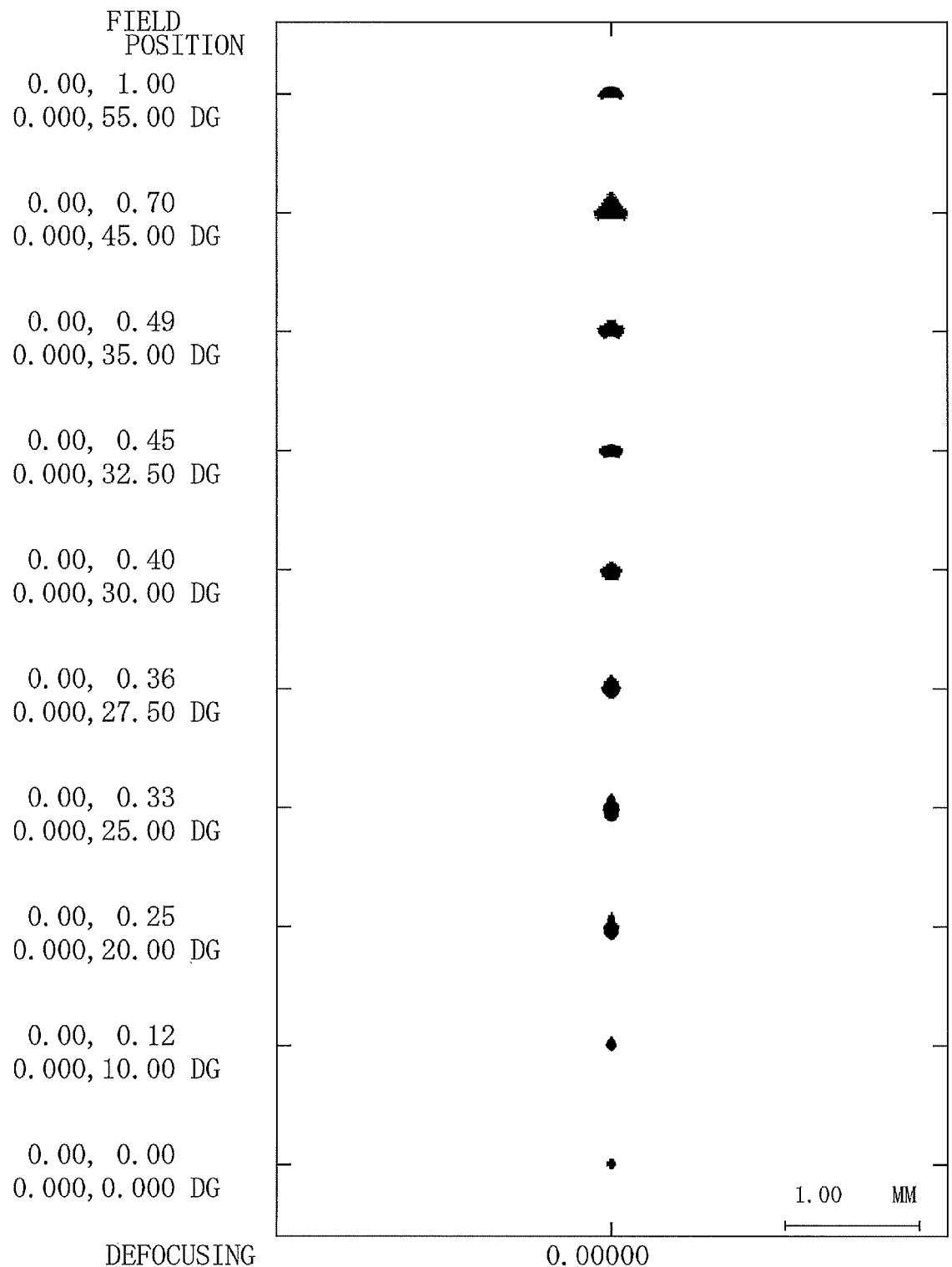
FIG. 23 is a spot diagram of the ocular optical system according to the fourth example.
Figure 24:
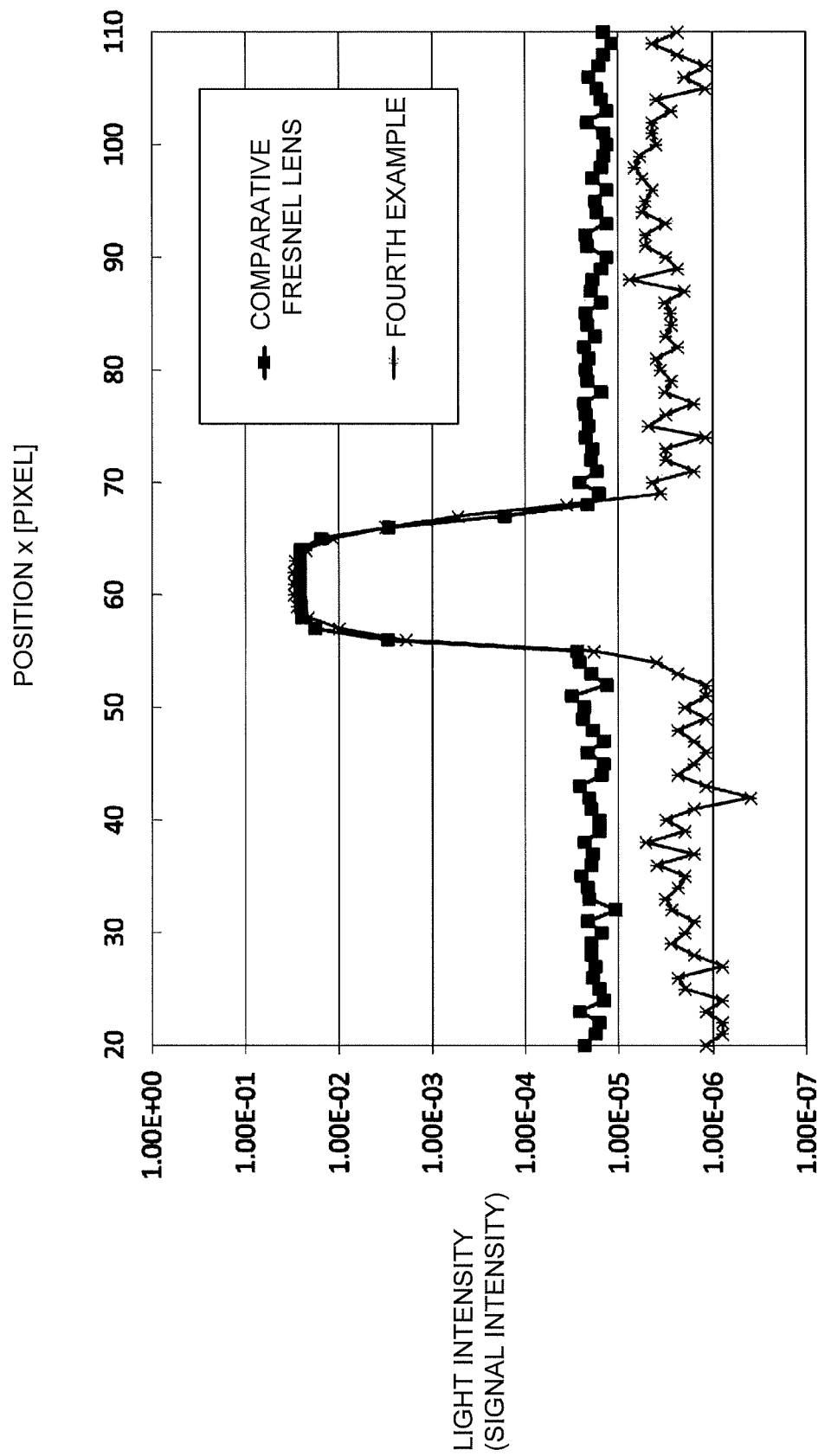
FIG. 24 is a flare comparative diagram of the ocular optical system according to the fourth example.

FIG. 21 shows various aberration graphs of the ocular optical system according to the fourth example. FIG. 22 shows a lateral aberration graph of the ocular optical system according to the fourth example. FIG. 23 is a spot diagram of the ocular optical system according to the fourth example. FIG. 24 is a flare comparative diagram of the ocular optical system according to the fourth example. From each aberration graph and the flare comparison diagram, it is apparent in the fourth embodiment that various aberrations are successfully corrected, flare is reduced as compared with the conventional Fresnel lens, and excellent image formation performance is obtained.

Fifth Example

Figure 25:
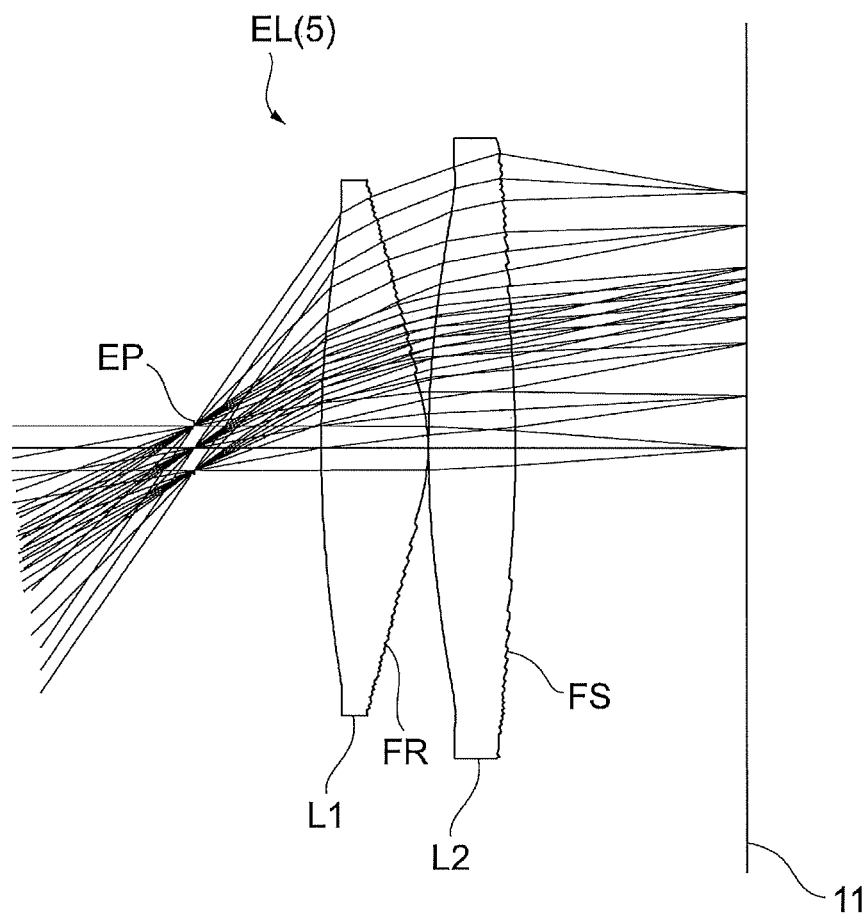
FIG. 25 is a lens configuration diagram of an ocular optical system according to a fifth example.

A fifth example will be described with reference to FIGS. 25 to 30 and Table 5. FIG. 25 is a diagram showing a lens configuration of an ocular optical system according to a fifth example of the present embodiment. The ocular optical system EL (5) according to the fifth example comprises, in order from an eyepoint EP side, a first biconvex Fresnel lens L1 having a positive refractive power, and a second biconvex lens L2 having a positive refractive power.

Figure 26:
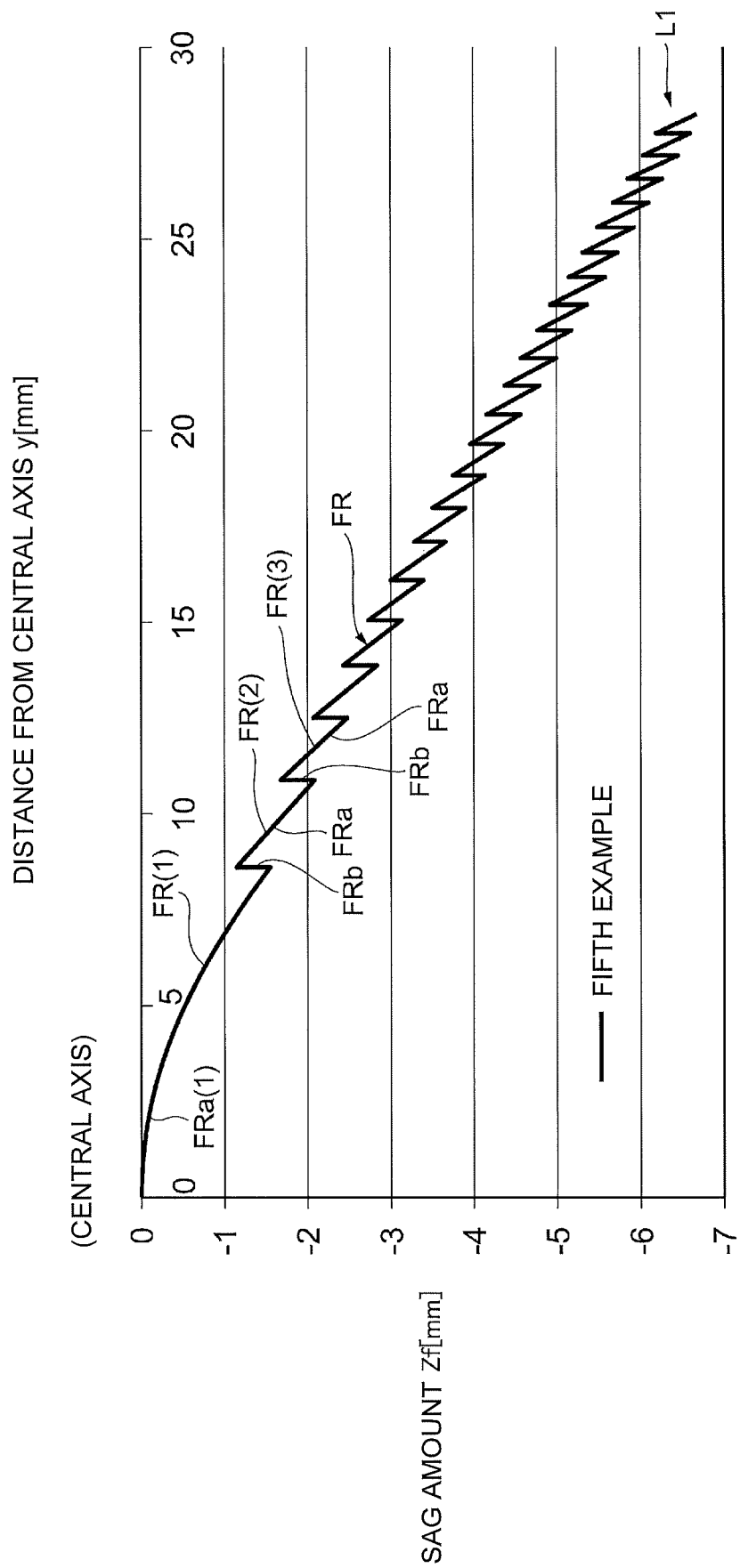
FIG. 26 is an enlarged view showing the shape of a Fresnel lens of the ocular optical system according to the fifth example.

An aspherical surface is formed on the lens surface on an eyepoint EP side of the first Fresnel lens L1. A plurality of Fresnel zones FR are formed on the lens surface on an image display part 11 side (observation object side) of the first Fresnel lens L1. As shown in FIG. 26, the first Fresnel zone FR (1) located on the most central axis side of the Fresnel lens L1 out of the plurality of Fresnel zones FR is formed in a disk shape coaxial with the central axis of the Fresnel lens L1. The first Fresnel zone FR (1) has a Fresnel surface portion FRa (1) having an aspherical shape. The second and subsequent Fresnel zones FR counted from the central axis side of the Fresnel lens L1 out of the plurality of Fresnel zones FR are formed in an annular shape coaxial with the central axis of the Fresnel lens L1. The second and subsequent Fresnel zones FR each have an aspherical Fresnel surface portion FRa and a stepped and wall-shaped wall surface portion FRb. The vertex portions of the respective Fresnel zones FR are arranged side by side along the above-mentioned arrangement reference aspherical surface.

An aspherical surface is formed on the lens surface on an eyepoint EP side of the second Fresnel lens L2. A plurality of Fresnel zones FS are formed on the lens surface on an image display part 11 side (observation object side) of the second Fresnel lens L2. Each Fresnel zone FS of the second Fresnel lens L2 has a shape similar to that of each Fresnel zone FR of the first Fresnel lens L1, but does not satisfy the conditions of the conditional expression (1) and the like.

The following Table 5 lists specification values of the ocular optical system according to the fifth example.

TABLE 5

[Specification Data]

f = 33.15
ω = ±55°
ER = 14.30
TL = 62.26
DA = 58.00
PAC1 = 1.76
PAE1 = 0.76
PAE2 = 0.89
PAE3 = 0.96
PMX1 = 8.59
PMN1 = 0.52
PMX2 = 8.59
PMN2 = 1.36
PMX3 = 2.28
PMN3 = 1.36
QC1 = 3
QE1 = 9
QE2 = 6

[Lens Data]

| Surface Number | R | D | vd | nd |
|---|---|---|---|---|
| 1*a | 133.7615567 | 12.12 | 57.07 | 1.4929 |
| 2*b | −23.56616307 | 0.10 | | |
| 3*a | 118.0305422 | 9.70 | 57.07 | 1.4929 |
| 4*b | −180.0000000 | 26.05 | | |

[Aspherical Surface Data]

1st Surface k = −5.69
C4 = 0.00E+00, C6 = −4.13E−09, C8 = 9.50E−12,
C10 = −6.03E−15, C12 = −3.33E−19
C14 = 0.00E+00, C16 = 0.00E+00, C18 = 0.00E+00,
C20 = 0.00E+00

2nd Surface (arrangement reference aspherical surface)

kd = −13.00
A4 = 0.00E+00, A6 = 0.00E+00, A8 = 0.00E+00,
A10 = 0.00E+00, A12 = 0.00E+00
A14 = 0.00E+00, A16 = 0.00E+00, A18 = 0.00E+00,
A20 = 0.00E+00

2nd Surface (shape reference aspherical surface)

kr = −1.25
B4 = 0.00E+00, B6 = −7.41E−09, B8 = 2.01E−11,
B10 = −1.30E−14, B12 = 0.00E+00

TABLE 5-continued

B14 = 0.00E+00, B16 = 0.00E+00, B18 = 0.00E+00,
B20 = 0.00E+00
3rd Surface k = 0.72
C4 = 0.00E+00, C6 = −5.61E−09, C8 = 9.74E−12,
C10 = −3.75E−15, C12 = −1.97E−18
C14 = 0.00E+00, C16 = 0.00E+00, C18 = 0.00E+00,
C20 = 0.00E+00
4th Surface (arrangement reference aspherical surface)

$k_d$ = −10.00
A4 = 0.00E+00, A6 = 0.00E+00, A8 = 0.00E+00,
A10 = 0.00E+00, A12 = 0.00E+00
A14 = 0.00E+00, A16 = 0.00E+00, A18 = 0.00E+00,
A20 = 0.00E+00
4th Surface (shape reference aspherical surface)

$k_r$ = −3.05
B4 = 0.00E+00, B6 = −1.55E−08, B8 = 1.88E−11,
B10 = −8.57E−15, B12 = 0.00E+00
B14 = 0.00E+00, B16 = 0.00E+00, B18 = 0.00E+00,
B20 = 0.00E+00

[Fresnel Data]

| Zone | Valley Coordinate y | Valley Coordinate z | Mountain Coordinate y | Mountain Coordinate z | Pitch |
|---|---|---|---|---|---|
| 1-1 | 8.5915 | −1.5557 | 8.6404 | −1.1734 | 8.59 |
| 2-3 | 10.8706 | −2.0833 | 10.9301 | −1.7104 | 2.28 |
| 3-4 | 12.5259 | −2.4898 | 12.5926 | −2.1246 | 1.66 |
| 4-5 | 13.8843 | −2.8338 | 13.9566 | −2.4755 | 1.36 |
| 5-6 | 15.0634 | −3.1384 | 15.1401 | −2.7861 | 1.18 |
| 6-7 | 16.1209 | −3.4154 | 16.2014 | −3.0687 | 1.06 |
| 7-8 | 17.0906 | −3.6721 | 17.1743 | −3.3304 | 0.97 |
| 8-9 | 17.9938 | −3.9132 | 18.0803 | −3.5761 | 0.90 |
| 9-10 | 18.8454 | −4.1421 | 18.9345 | −3.8092 | 0.85 |
| 10-11 | 19.6561 | −4.3613 | 19.7475 | −4.0322 | 0.81 |
| 11-12 | 20.4340 | −4.5725 | 20.5274 | −4.2470 | 0.78 |
| 12-13 | 21.1852 | −4.7774 | 21.2805 | −4.4551 | 0.75 |
| 13-14 | 21.9145 | −4.9771 | 22.0116 | −4.6577 | 0.73 |
| 14-15 | 22.6255 | −5.1723 | 22.7241 | −4.8557 | 0.71 |
| 15-16 | 23.3208 | −5.3638 | 23.4209 | −5.0497 | 0.70 |
| 16-17 | 24.0021 | −5.5519 | 24.1036 | −5.2402 | 0.68 |
| 17-18 | 24.6703 | −5.7368 | 24.7729 | −5.4274 | 0.67 |
| 18-19 | 25.3250 | −5.9184 | 25.4286 | −5.6113 | 0.65 |
| 19-20 | 25.9650 | −6.0963 | 26.0694 | −5.7916 | 0.64 |
| 20-21 | 26.5882 | −6.2697 | 26.6932 | −5.9676 | 0.62 |
| 21-22 | 27.1916 | −6.4380 | 27.2968 | −6.1387 | 0.60 |
| 22-23 | 27.7718 | −6.6000 | 27.8771 | −6.3039 | 0.58 |
| 23-24 | 28.3256 | −6.7548 | 28.4305 | −6.4623 | 0.55 |

[Conditional Expression Corresponding Value]

Conditional Expression (1) PAE1/PAC1 = 0.43
Conditional Expression (2) PAE2/PAC1 = 0.51
Conditional Expression (3) PAE3/PAC1 = 0.55
Conditional Expression (4) PAC1 = 1.76
Conditional Expression (5) PMX1/PMN1 = 16.38
Conditional Expression (6) PMX2/PMN2 = 6.32
Conditional Expression (7) PMX3/PMN3 = 1.68
Conditional Expression (8) QE1/QC1 = 3.0
Conditional Expression (9) QE2/QC1 = 2.0
Conditional Expression (10) $k_d$ = −13.00
Conditional Expression (11) $k_r$ = −1.25(>$k_d$)

Figure 27:
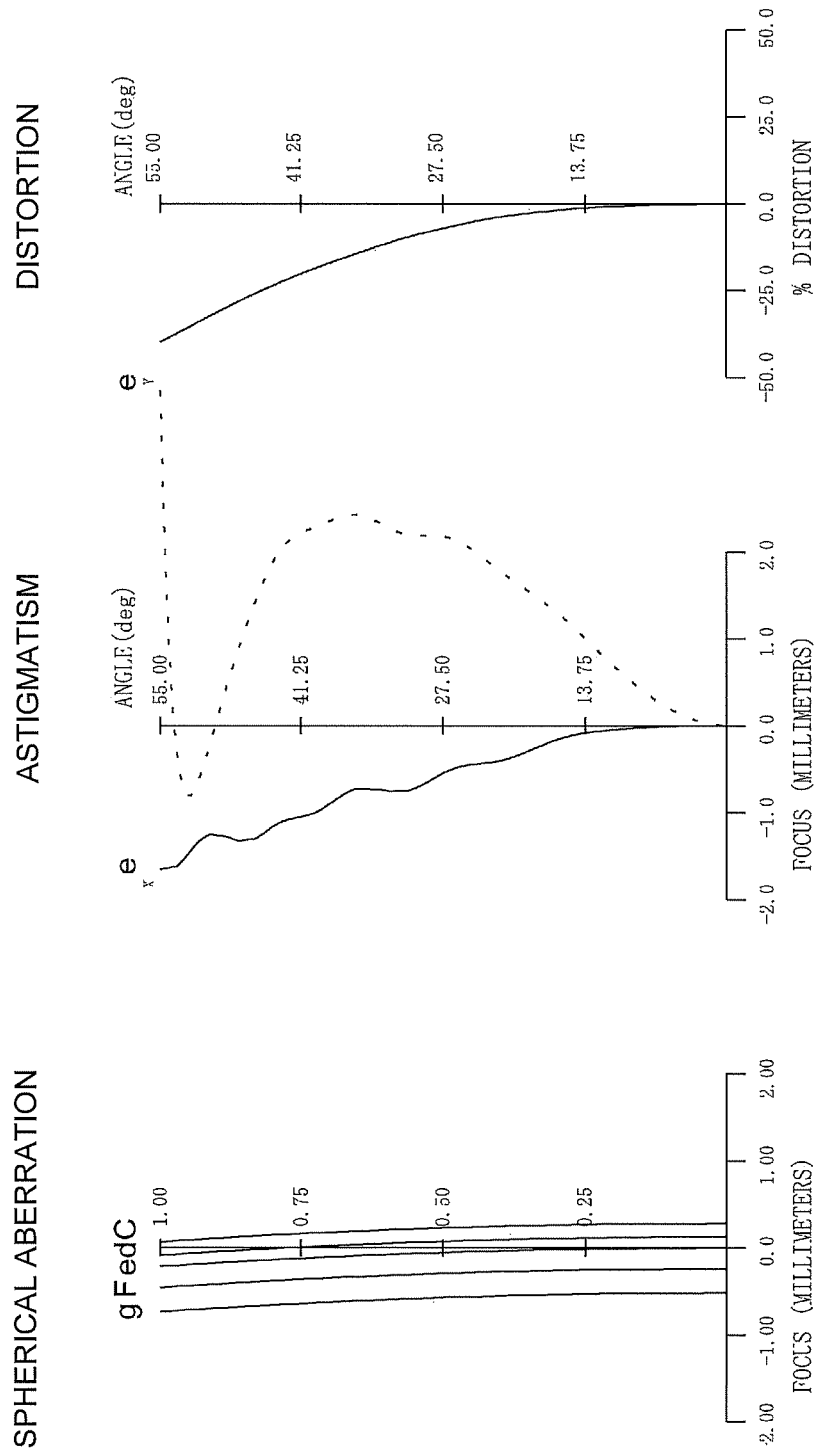
FIG. 27 shows various aberration graphs of the ocular optical system according to the fifth example.
Figure 28:
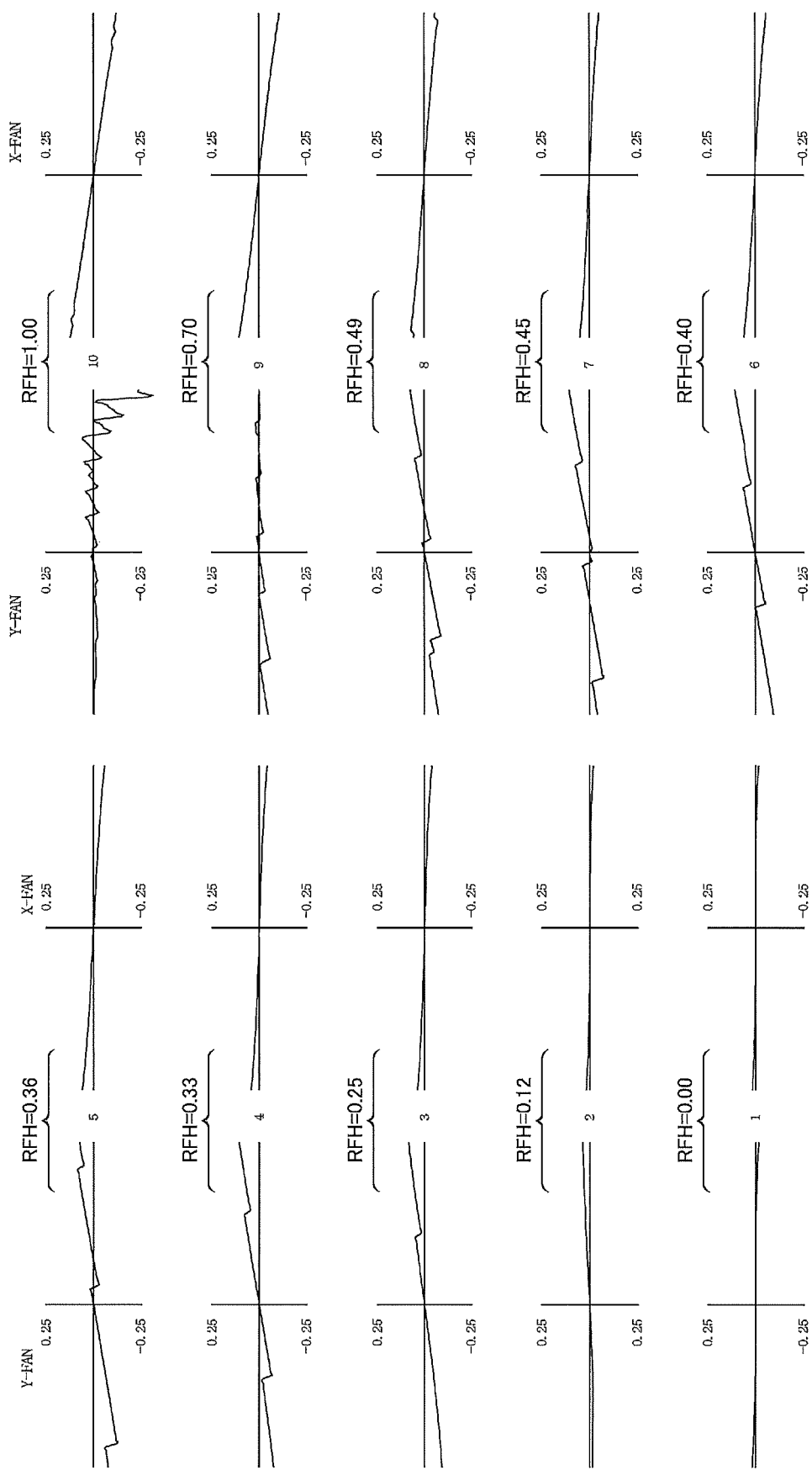
FIG. 28 shows a lateral aberration graph of the ocular optical system according to the fifth example.
Figure 29:
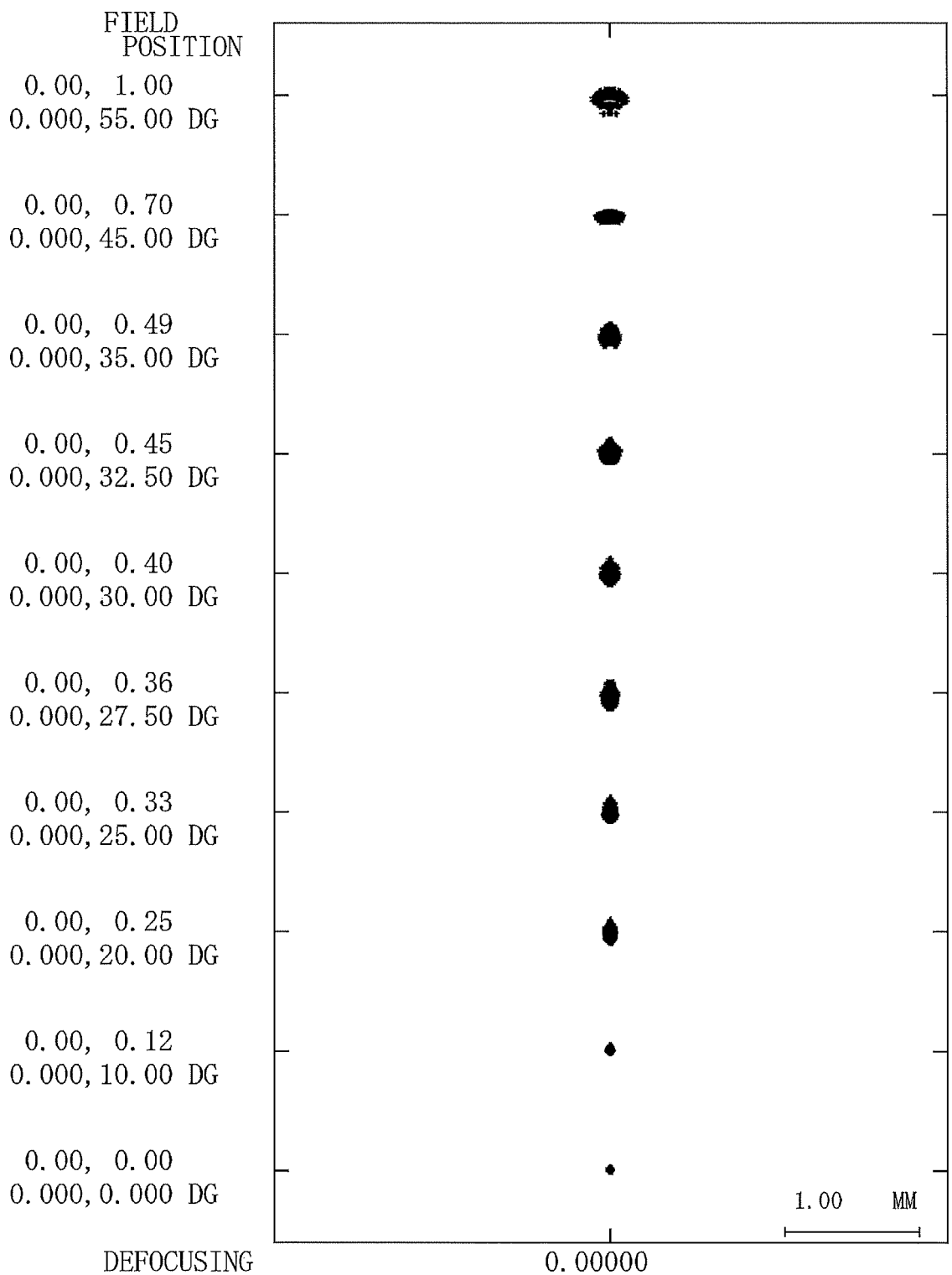
FIG. 29 is a spot diagram of the ocular optical system according to the fifth example.
Figure 30:
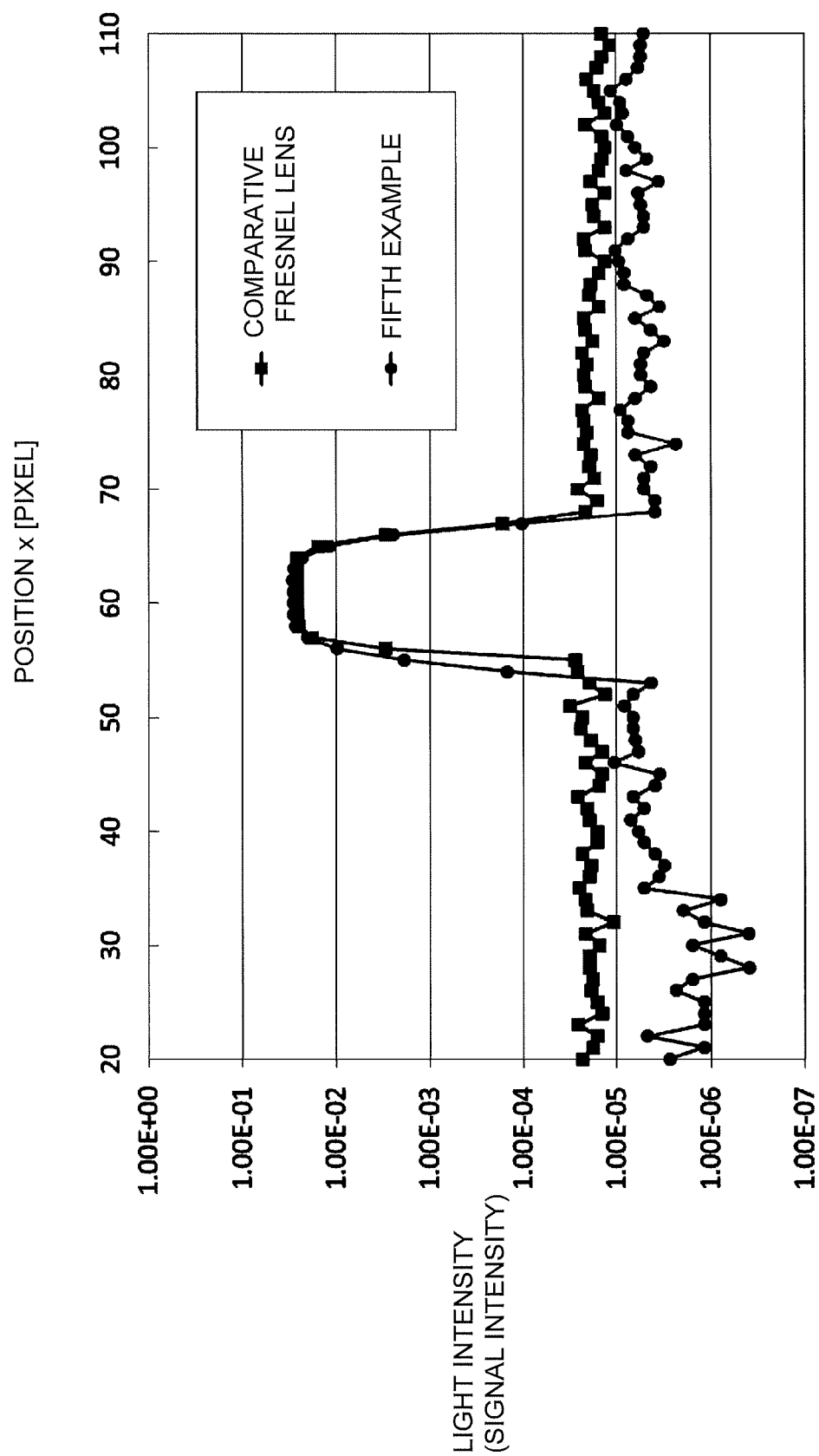
FIG. 30 is a flare comparative diagram of the ocular optical system according to the fifth example.

FIG. 27 shows various aberration graphs of the ocular optical system according to the fifth example. FIG. 28 shows a lateral aberration graph of the ocular optical system according to the fifth example. FIG. 29 is a spot diagram of the ocular optical system according to the fifth example. FIG. 30 is a flare comparative diagram of the ocular optical system according to the fifth example. From each aberration graph and the flare comparison diagram, it is apparent in the fifth example that various aberrations are successfully corrected, flare is reduced as compared with the conventional Fresnel lens, and excellent image formation performance is obtained.

As described above, according to each example, it is possible to realize an ocular optical system in which flare occurring in the neighborhood portion of the central axis of the Fresnel lens L1 is reduced.

In each example, the wall surface portions FRb of a plurality of Fresnel zones FR may be coated with light-shielding members (not shown) made of paint using black synthetic resin. Examples of the paint using the black synthetic resin include curable acrylic urethane paint, phthalic acid resin enamel paint and the like.

Note that the following contents can be appropriately adopted as long as the optical performance of the optical system of the present embodiment is not impaired.

As numerical examples of the ocular optical system of the present embodiment a one-sheet configuration and a two-sheet configuration are shown. However, the present application is not limited to these configurations, and an ocular optical system having other configurations (for example, three-sheet configuration and the like) may be configured. Specifically, a lens or a lens group may be added on the most object side or the most image surface side of the ocular optical system of the present embodiment.

The lens surface may be formed of a spherical surface or a flat surface, or may be formed of an aspherical surface. When the lens surface is a spherical surface or a flat surface, lens processing and assembly adjustment are facilitated, and deterioration of optical performance caused by errors in processing and assembly adjustment can be prevented.

When the lens surface is an aspherical surface, the aspherical surface may be any one of an aspherical surface formed by grinding, a glass mold aspherical surface formed by forming glass into an aspherical shape with a mold, and a composite type aspherical surface formed by forming resin on the surface of glass in an aspherical shape. Further, the lens surface may be a diffractive optical surface, and the lens may be a gradient index lens (GRIN lens) or a plastic lens.

EXPLANATION OF NUMERALS AND CHARACTERS

1 Head mounted display
11 image display part (observation object)
EL ocular optical system
L1 Fresnel lens
FR Fresnel zone
EP eyepoint

The invention claimed is:
1. An ocular optical system comprising:
a Fresnel lens including a plurality of Fresnel zones formed on a lens surface on an observation object side, wherein
the plurality of Fresnel zones are arranged concentrically side by side along an aspherical surface having a shape which is rotationally symmetric with respect to a central axis of the Fresnel lens, and satisfy the following conditional expression:

$0 < PAE1/PAC1 \leq 0.50$, where
PAE1 represents an average pitch in a radial direction of Fresnel zones formed in a portion having a radius of 15 mm or more from the central axis of the Fresnel lens out of the plurality of Fresnel zones, and PAC1 represents an average pitch in the radial direction of Fresnel zones formed in a portion having a radius of 15 mm or less from the central axis of the Fresnel lens excluding a first Fresnel zone located on a most central axis side of the Fresnel lens out of the plurality of Fresnel zones, wherein the aspherical surface is expressed by using the following expression:

[Expression 1]

$$Z_d = \frac{y^2/R_d}{1+\sqrt{1-(1+k_d)y^2/R_d^2}} + \sum_{i=2}^{10} A_{2i} \times y^{2i}$$

where $Z_d$ represents a sag amount of the aspherical surface at a distance y from the central axis of the Fresnel lens,
$R_d$ represents a radius of curvature of a reference spherical surface,
$k_d$ represents a conic constant, and
$A_{2i}$ represents a (2×i)-order aspherical coefficient, and
the following expression is satisfied:

$k_d \leq -5.0$.

2. The ocular optical system according to claim 1, wherein the following conditional expression is satisfied:

$0 < PAE2/PAC1 \leq 0.55$, where

PAE2 represents an average pitch in the radial direction of Fresnel zones formed in a portion having a radius of 15 mm to 22.5 mm from the central axis of the Fresnel lens out of the plurality of Fresnel zones.

3. The ocular optical system according to claim 1, wherein the following conditional expression is satisfied:

$0 < PAE3/PAC1 \leq 0.60$, where

PAE3 represents an average pitch in the radial direction of Fresnel zones formed in a portion having a radius of 15 mm to 20 mm from the central axis of the Fresnel lens out of the plurality of Fresnel zones.

4. The ocular optical system according to claim 1, wherein the following conditional expression is satisfied:

$PAC1 \geq 1.0$ [mm].

5. The ocular optical system according to claim 1, wherein the following conditional expression is satisfied:

$PMX1/PMN1 \geq 10.0$, where

PMX1 represents a maximum pitch in the radial direction of the plurality of Fresnel zones, and
PMN1 represents a minimum pitch in the radial direction of the plurality of Fresnel zones.

6. The ocular optical system according to claim 1, wherein the following conditional expression is satisfied:

$1 < PMX2/PMN2 \leq 7.5$, where

PMX2 represents a maximum pitch in the radial direction of Fresnel zones formed in a portion having a radius of 15 mm or less from the central axis of the Fresnel lens out of the plurality of Fresnel zones, and
PMN2 represents a minimum pitch in the radial direction of the Fresnel zones formed in the portion having the radius of 15 mm or less from the central axis of the Fresnel lens out of the plurality of Fresnel zones.

7. The ocular optical system according to claim 1, wherein the following conditional expression is satisfied:

$1 < PMX3/PMN3 \leq 2.5$, where

PMX3 represents a maximum pitch in the radial direction of Fresnel zones formed in a portion having a radius of 15 mm or less from the central axis of the Fresnel lens excluding the first Fresnel zone out of the plurality of Fresnel zones, and
PMN3 represents a minimum pitch in the radial direction of the Fresnel zones formed in the portion having the radius of 15 mm or less from the central axis of the Fresnel lens excluding the first Fresnel zone out of the plurality of Fresnel zones.

8. The ocular optical system according to claim 1, wherein the following conditional expression is satisfied:

$QE1/QC1 \geq 2.0$, where

QE1 represents the number of Fresnel zones formed in a portion having a radius of 15 mm to 22.5 mm from the central axis of the Fresnel lens out of the plurality of Fresnel zones, and
QC1 represents the number of Fresnel zones formed in a portion having a radius of 15 mm or less from the central axis of the Fresnel lens excluding the first Fresnel zone out of the plurality of Fresnel zones.

9. The ocular optical system according to claim 1, wherein the following conditional expression is satisfied:

$QE2/QC1 \geq 1.0$, where

QE2 represents the number of Fresnel zones formed in a portion having a radius of 15 mm to 20 mm from the central axis of the Fresnel lens out of the plurality of Fresnel zones, and
QC1 represents the number of Fresnel zones formed in a portion having a radius of 15 mm or less from the central axis of the Fresnel lens excluding the first Fresnel zone out of the plurality of Fresnel zones.

10. The ocular optical system according to claim 1, wherein wall surface portions of the plurality of Fresnel zones are provided with light-shielding members.

11. The ocular optical system according to claim 1, wherein an outer diameter of the Fresnel lens is 45 mm to 70 mm.

12. A head mounted display comprising:

an image display part capable of displaying an image; and
an ocular optical system for observing an image displayed on the image display part, wherein the ocular optical system is the ocular optical system according to claim 1.

* * * * *